United States Patent
Cheng et al.

(10) Patent No.: US 10,878,578 B2
(45) Date of Patent: Dec. 29, 2020

(54) EXCLUSION ZONE IN VIDEO ANALYTICS

(71) Applicant: QUALCOMM Incorporated, San Diego, CA (US)

(72) Inventors: Ke-Li Cheng, San Diego, CA (US); Ying Chen, San Diego, CA (US); Yang Zhou, San Jose, CA (US); Chen-Lan Chester Yen, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/172,534

(22) Filed: Oct. 26, 2018

(65) Prior Publication Data

US 2019/0130582 A1 May 2, 2019

Related U.S. Application Data

(60) Provisional application No. 62/579,125, filed on Oct. 30, 2017.

(51) Int. Cl.
| | | |
|---|---|---|
| *G06K 9/00* | (2006.01) | |
| *G06T 7/254* | (2017.01) | |
| *G06T 7/246* | (2017.01) | |
| *G06T 7/20* | (2017.01) | |

(Continued)

(52) U.S. Cl.
CPC ............ *G06T 7/20* (2013.01); *G06K 9/00503* (2013.01); *G06K 9/00771* (2013.01); *G06K 9/38* (2013.01);

(Continued)

(58) Field of Classification Search
CPC ....... G06K 9/00503; G06K 2009/3291; G06K 9/00771; G06K 9/38; G06T 2207/20224;

(Continued)

(56) References Cited

U.S. PATENT DOCUMENTS

| | | | |
|---|---|---|---|
| 2010/0128927 A1* | 5/2010 | Ikenoue | G06K 9/00261 382/103 |
| 2012/0163657 A1 | 6/2012 | Shellshear | |

(Continued)

FOREIGN PATENT DOCUMENTS

WO 0169931 A1 9/2001

OTHER PUBLICATIONS

International Search Report and Written Opinion—PCT/US2018/057967—ISA/EPO—dated Jan. 4, 2019.

(Continued)

*Primary Examiner* — Said M Elnoubi
(74) *Attorney, Agent, or Firm* — Polsinelli/Qualcomm

(57) ABSTRACT

Provided are methods, apparatus, and computer-readable mediums for tracking objects that intersect with an exclusion zone defined for a scene being captured by a video camera. An exclusion zone can delineate an area of a video frame where background objects may be moving. The exclusion zone informs an object tracking system that objects within the exclusion zone should not be tracked. In various implementations, the object tracking system can determine that a bounding box for a blob intersects with the exclusion zone. The object tracking system can further, based on the bounding box intersecting with the exclusion zone, prevent outputting of a blob tracker associated with the blob.

30 Claims, 13 Drawing Sheets

(51) Int. Cl.
*G06T 7/194* (2017.01)
*G06T 7/11* (2017.01)
*G06K 9/38* (2006.01)
*G06K 9/32* (2006.01)
*G06T 7/277* (2017.01)

(52) U.S. Cl.
CPC ............... *G06T 7/11* (2017.01); *G06T 7/194* (2017.01); *G06T 7/248* (2017.01); *G06T 7/254* (2017.01); *G06K 2009/3291* (2013.01); *G06T 7/277* (2017.01); *G06T 2207/10016* (2013.01); *G06T 2207/20224* (2013.01)

(58) Field of Classification Search
CPC ... G06T 7/11; G06T 7/194; G06T 7/20; G06T 2207/10016; G06T 7/248; G06T 7/254; G06T 7/277
See application file for complete search history.

(56) References Cited

U.S. PATENT DOCUMENTS

2013/0148852 A1* 6/2013 Partis ................... G06T 7/194
382/103
2016/0342845 A1* 11/2016 Tien-Spalding ...........................
G08B 13/19656

OTHER PUBLICATIONS

Khan S.M., et al., "Tracking Multiple Occluding People by Localizing on Multiple Scene Planes", IEEE Transactions on Pattern Analysis and Machine Intelligence, vol. 31. No. 3, Mar. 2009 (Mar. 2009), pp. 505-519. XP055535327, USA, ISSN: 0162-8828. DOI:10.1109/TPAMI.2008.102, abstract Sec. 1, Sec. 4.1.

\* cited by examiner

EXCLUSION ZONE IN VIDEO ANALYTICS

CROSS-REFERENCE TO RELATED APPLICATIONS

This application claims the benefit of U.S. Provisional Application No. 62/579,125, filed Oct. 30, 2017, which is hereby incorporated by reference, in its entirety and for all purposes.

FIELD

The present disclosure generally relates to video analytics, and more specifically to techniques and systems for removing false positive detection of object trackers in an exclusive or exclusion zone.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption. In some cases, the video data can also be processed by the devices and systems themselves.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. The system with the video analytics can be on a camera device and/or on a server. In some cases, video analytics can send alerts or alarms for certain events of interest. More advanced video analytics is needed to provide efficient and robust video sequence processing.

BRIEF SUMMARY

In some embodiments, techniques and systems are described for maintaining object trackers (or blob trackers) in video analytics and suppressing trackers for blobs that are in an exclusive or exclusion zone. A blob represents at least a portion of one or more objects in a video frame (also referred to as a "picture"). In some examples, using video analytics, blob detection can be performed for one or more video frames to generate or identify blobs for the one or more video frames. Temporal information of the blobs can be used to identify stable objects or blobs so that a tracking layer can be established. After the blob detection process, a tracker can be associated with the blob.

One or more exclusion zones (also referred to as exclusive zones) can be defined in a scene being captured by a sequence of video frames. The exclusion zones can encompass regions of the scene that include objects (e.g., trees, video screens, doors, windows, among others) that can include moving or changing pixels, and thus can be identified as foreground objects. By having a box or other shape defined around these regions, the region can be marked as one where objects should not be tracked. The exclusion zone can be defined manually (e.g., based on user input) and/or automatically based on object detection results.

According to at least one example, a method of maintaining blob trackers for video frames is provided that includes identifying a blob tracker maintained for a current video frame, wherein the blob tracker is associated with a blob detected in one or more video frames, the blob including pixels of at least a portion of an object in the one or more video frames. The method further includes determining that a bounding region of the blob tracker intersects with an exclusion zone defined for the one or more video frames, wherein the exclusion zone is a region of the one or more video frames in which objects are not tracked. The method further includes preventing outputting of the blob tracker, wherein outputting of the blob tracker is prevented based on the bounding region for the blob intersecting with the exclusion zone.

In another example, an apparatus is provided that includes a memory configured to store video data and a processor. The processor is configured to and can identify a blob tracker maintained for a current video frame, wherein the blob tracker is associated with a blob detected in one or more video frames, the blob including pixels of at least a portion of an object in the one or more video frames. The processor is configured to and can determine that a bounding region of the blob tracker intersects with an exclusion zone defined for the one or more video frames, wherein the exclusion zone is a region of the one or more video frames in which objects are not tracked. The processor is configured to and can prevent outputting of the blob tracker, wherein outputting of the blob tracker is prevented based on the bounding region for the blob intersecting with the exclusion zone.

In another example, a computer readable medium is provided having stored thereon instructions that when executed by a processor perform a method that includes: identifying a blob tracker maintained for a current video frame, wherein the blob tracker is associated with a blob detected in one or more video frames, the blob including pixels of at least a portion of an object in the one or more video frames. The method further includes determining that a bounding region of the blob tracker intersects with an exclusion zone defined for the one or more video frames, wherein the exclusion zone is a region of the one or more video frames in which objects are not tracked. The method further includes preventing outputting of the blob tracker, wherein outputting of the blob tracker is prevented based on the bounding region for the blob intersecting with the exclusion zone.

In another example, an apparatus is provided that includes means for identifying a blob tracker maintained for a current video frame, wherein the blob tracker is associated with a blob detected in one or more video frames, the blob including pixels of at least a portion of an object in the one or more video frames. The apparatus further comprises means for determining that a bounding region of the blob tracker intersects with an exclusion zone defined for the one or more video frames, wherein the exclusion zone is a region of the one or more video frames in which objects are not tracked. The apparatus further comprises means for preventing outputting of the blob tracker, wherein outputting of the blob tracker is prevented based on the bounding region for the blob intersecting with the exclusion zone.

In some aspects, the methods, apparatuses, and computer-readable medium described above further comprise determining, for a next video frame, that a next bounding region for the blob is outside the exclusion zone, the next bounding region being determined using the next video frame. These aspects further include outputting the blob tracker for the next video frame. In some implementations, the blob tracker is output for the next video frame based on a predicted bounding region associated with the blob tracker, wherein the next bounding region is in a location predicted by the predicted bounding region.

In some aspects, the bounding region for the blob is determined to intersect with the exclusion zone when an area encompassed by the bounding region overlaps with the region of the exclusion zone by a threshold amount.

In some aspects, the methods, apparatuses, and computer-readable medium described above further comprise receiving user input, and defining the exclusion zone based on the received user input. In some cases, the user input is received using an input interface of the apparatus. In some cases, the user input is received from a remote device.

In some aspects, the methods, apparatuses, and computer-readable medium described above further comprise obtaining object detection results for at least one video frame of the video frames, and defining the exclusion zone based on the object detection results. The object detection results include a background indication for at least one object in an area associated with the exclusion zone.

In some aspects of the methods, apparatuses, and computer-readable medium described above, a state for the blob tracker is a new state. These aspects further comprise determining whether to change the state from the new state to a normal state, wherein, upon determining that the bounding region for the blob intersects with the exclusion zone, the state is changed to a dead state. In some aspects, the blob tracker includes a history of bounding regions including the bounding region, and wherein the blob tracker is prevented from being output when any bounding region from the history of bounding regions is within the exclusion zone.

In some aspects of the methods, apparatuses, and computer-readable medium described above further comprise continuing to track the blob while the bounding region for the blob intersects with the exclusion zone in one or more subsequent video frames.

In some aspects a state for the blob tracker is a vanishing state. These aspects further include changing the state to a none state based on the bounding region for the blob intersecting with the exclusion zone In some aspects, the methods, apparatuses, and computer-readable medium described above further comprise determining, for a next video frame, that a count of video frames is greater than or equal to a threshold number of video frames. These aspects further further deleting the blob tracker.

In some aspects, the methods, apparatuses, and computer-readable medium described above further comprise determining a predicted bounding region using the blob tracker, wherein a dimension of the predicted bounding region is constrained to a corresponding dimension of the blob tracker. These aspects further include outputting the predicted bounding region in place of the blob tracker.

In some aspects, the region of the exclusion zone is defined by two or more pixel locations in the one or more video frames.

In some aspects, the apparatus comprises a mobile device. In some aspects, the apparatus comprises a camera for capturing the one or more images. In some cases, the apparatus comprises a display for displaying the one or more images. In some cases, the apparatus comprises a mobile device with a camera for capturing the one or more images and a display for displaying the one or more images.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The foregoing, together with other features and embodiments, will become more apparent upon referring to the following specification, claims, and accompanying figures. Illustrative embodiments of the present application are described in detail below with reference to the following figures:

DETAILED DESCRIPTION

Figure 1:
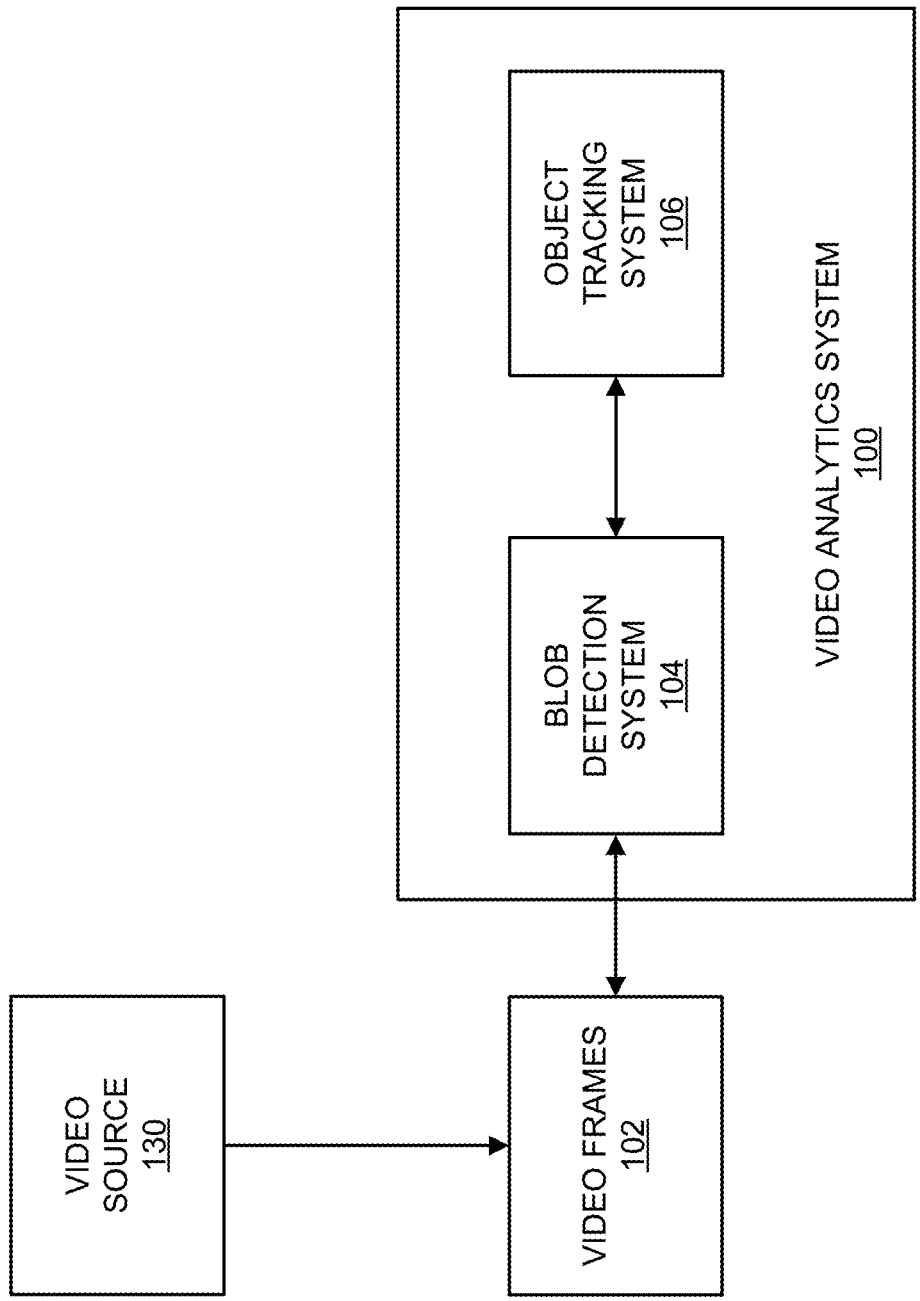
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, a video analytics system can generate and detect foreground blobs that can be used to perform various operations, such as object tracking (also called blob tracking) or some of the other operations described above. A blob tracker (also referred to as an object tracker) can be used to track one or more blobs in a video sequence. In some cases, a tracked blob can be considered as an object. A blob tracker can start to be associated with a blob in one frame, and can continue to be associated with the blob across one or more subsequent frames. In some situations, a blob detected in a video frame, though associated with a moving object, should not be tracked. For example, trees or bushes that may move in the wind should not be tracked, as these objects are typically background objects. As another example, when the scene includes a screen capable of displaying video advertisements, movements on the screen should not be tracked.

In various implementations, a video analytics system can enable an operator to delineate exclusion zones, also referred to herein as exclusive zones. Any moving objects within the exclusion zone are considered false positives by the object tracking system, and are thus not tracked. In various implementations, the object tracking system can consider whether a blob is within the exclusion zone when considering whether a blob tracker should be output for the blob. In these implementations, trackers for blobs that are detected within the exclusion zone are not output by the system.

Objects within the scene can interact with an exclusion zone. For example, an object can first be detected within the exclusion zone, and then move out of the exclusion zone. In this example, the object tracking system can start to track the object once the object has moved out of the exclusion zone. As another example, an object can move through an exclusion zone. In this example, the object tracking system can assign a state to the tracker for the object, referred to herein as a "normal exclude" state, so that output of the tracker is suppressed (or prevented) while the tracking information is maintained. If the object moves out of the exclusion zone, the state can be transitioned to one where the tracker can once again be output. As another example, an object first detected outside of the exclusion zone can move into the exclusion zone. In this example, the object tracking system can stop tracking the object once the object has been in the exclusion zone for a duration of time.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection system 104 and an object tracking system 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection system 104 can detect one or more blobs in video frames (e.g., video frames 102) of a video sequence, and the object tracking system 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding region. A bounding region of a blob or tracker can include a bounding box, a bounding circle, a bounding ellipse, or any other suitably-shaped region representing a tracker and/or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection system 104 and the object tracking system 106, the video analytics system 100 can perform blob generation and detection for each frame or picture of a video sequence. For example, the blob detection system 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection system 104 and the object tracking system 106 are described with respect to FIGS. 3-4.

Figure 2:
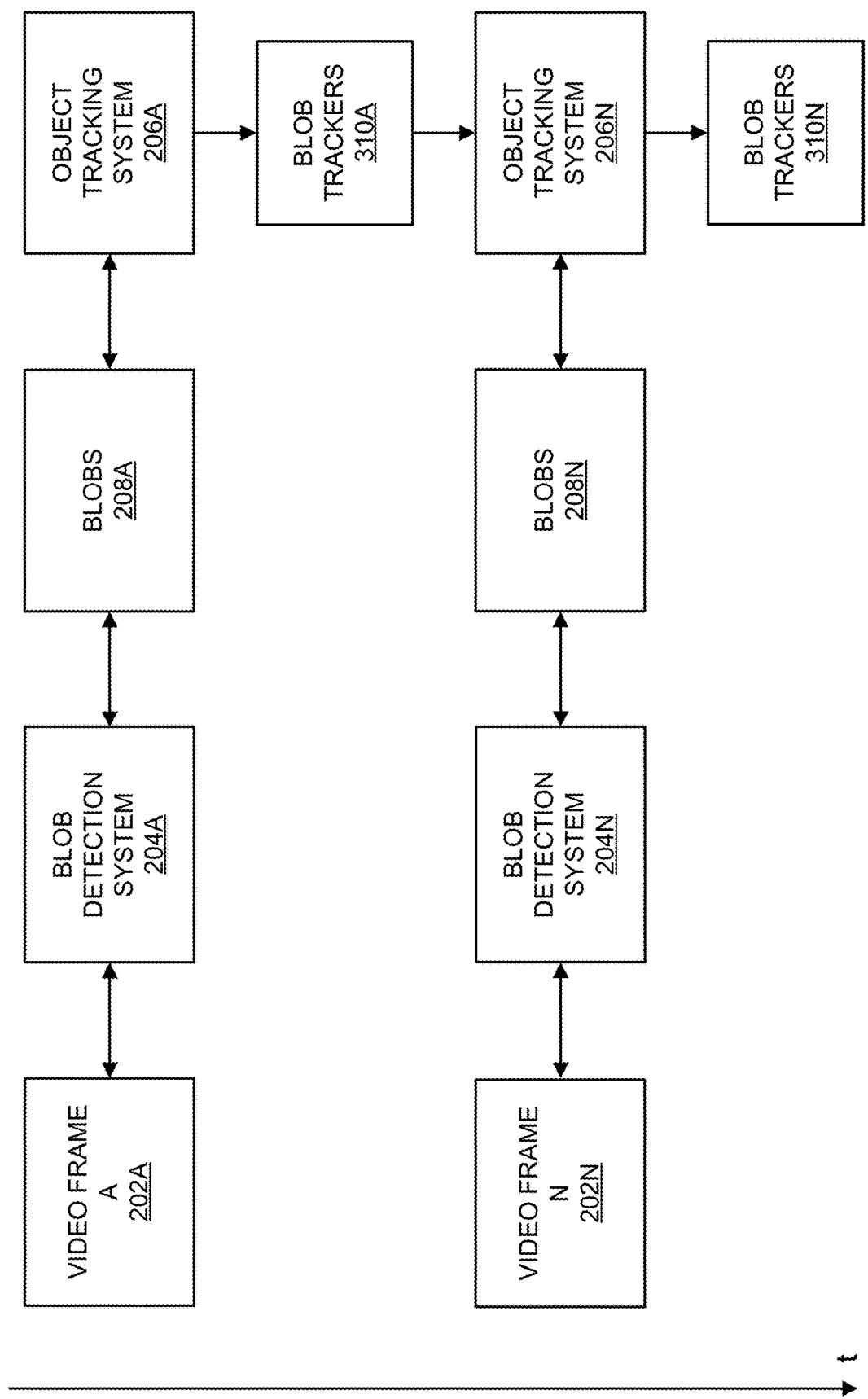
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection system 204A. The blob detection system 204A generates foreground blobs 208A for the current frame A 202A. After blob detection is performed, the foreground blobs 208A can be used for temporal tracking by the object tracking system 206A. Costs (e.g., a cost including a distance, a weighted distance, or other cost) between blob trackers and blobs can be calculated by the object tracking system 206A. The object tracking system 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection system 204N generates foreground blobs 208N for the frame N 202N. The object tracking system 206N can then perform temporal tracking of the blobs 208N. For example, the object tracking system 206N obtains the blob trackers 310A that were updated based on the prior video frame A 202A. The object tracking system 206N can then calculate a cost and can associate the blob trackers 310A and the blobs 208N using the newly calculated cost. The blob trackers 310A can be updated according to the data association to generate updated blob trackers 310N.

Figure 3:
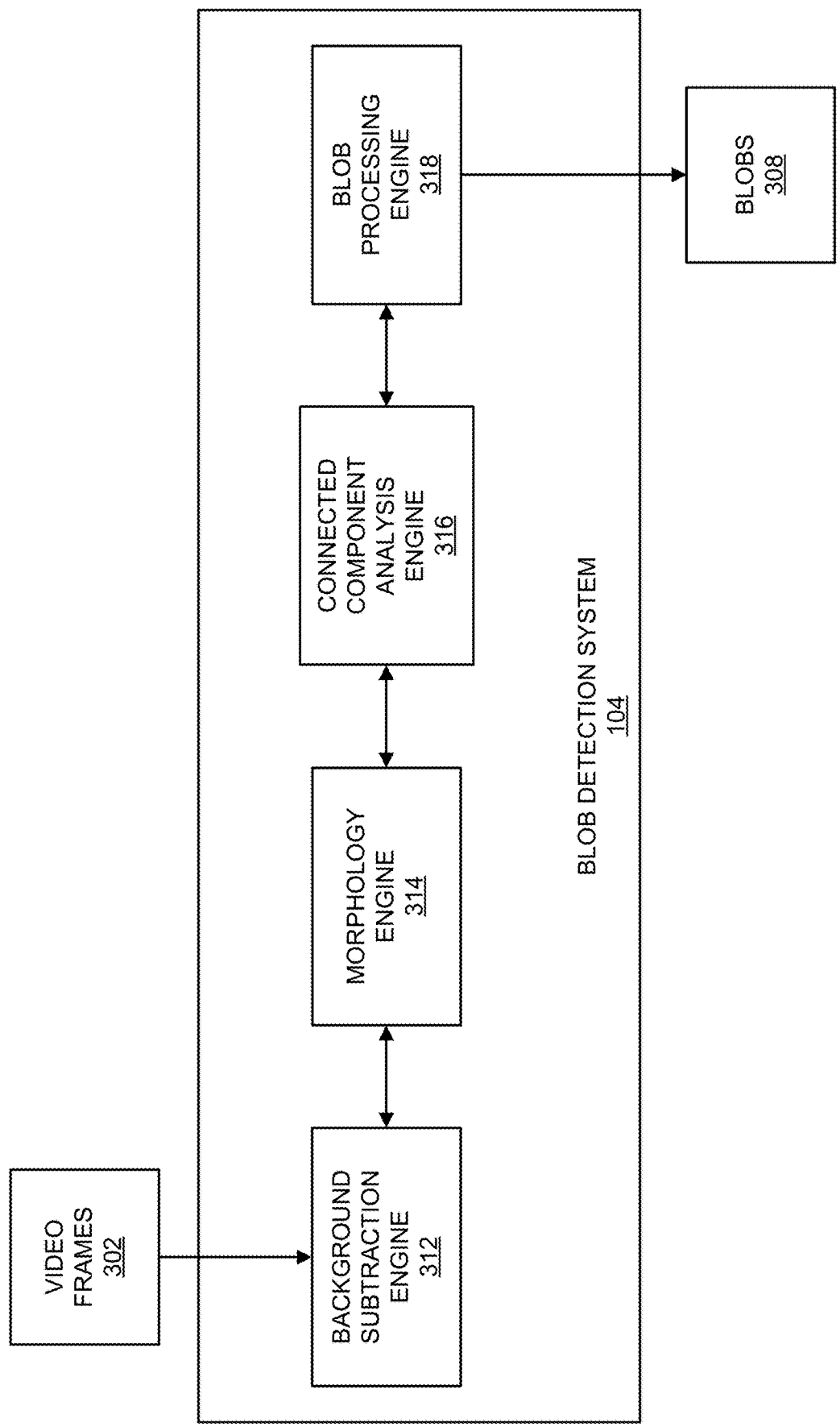
FIG. 3 is a block diagram illustrating an example of a blob detection system, in accordance with some examples.

FIG. 3 is a block diagram illustrating an example of a blob detection system 104. Blob detection is used to segment moving objects from the global background in a scene. The blob detection system 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (also referred to as a Gaussian mixture model (GMM)). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \Sigma_{i=1}^{K} \omega_{i,t} N(X_t | \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with a 3×3 window size is called first, and three function calls of dilation of the 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

for each pixel of the foreground mask
  if it is a foreground pixel and has not been processed, the following steps apply:
    Apply FloodFill function to connect this pixel to other foreground and generate a connected component
    Insert the connected component in a list of connected components.
    Mark the pixels in the connected component as being processed.

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being $(x+d, y)$ or $(x, y+d)$, wherein d is equal to 1 or −1 and $(x, y)$ is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking system 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection system 104 does not include the blob processing engine 318, or does not use the blob processing engine 318 in some instances. For example, the blobs generated by the connected component analysis engine 316, without further processing, can be input to the object tracking system 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
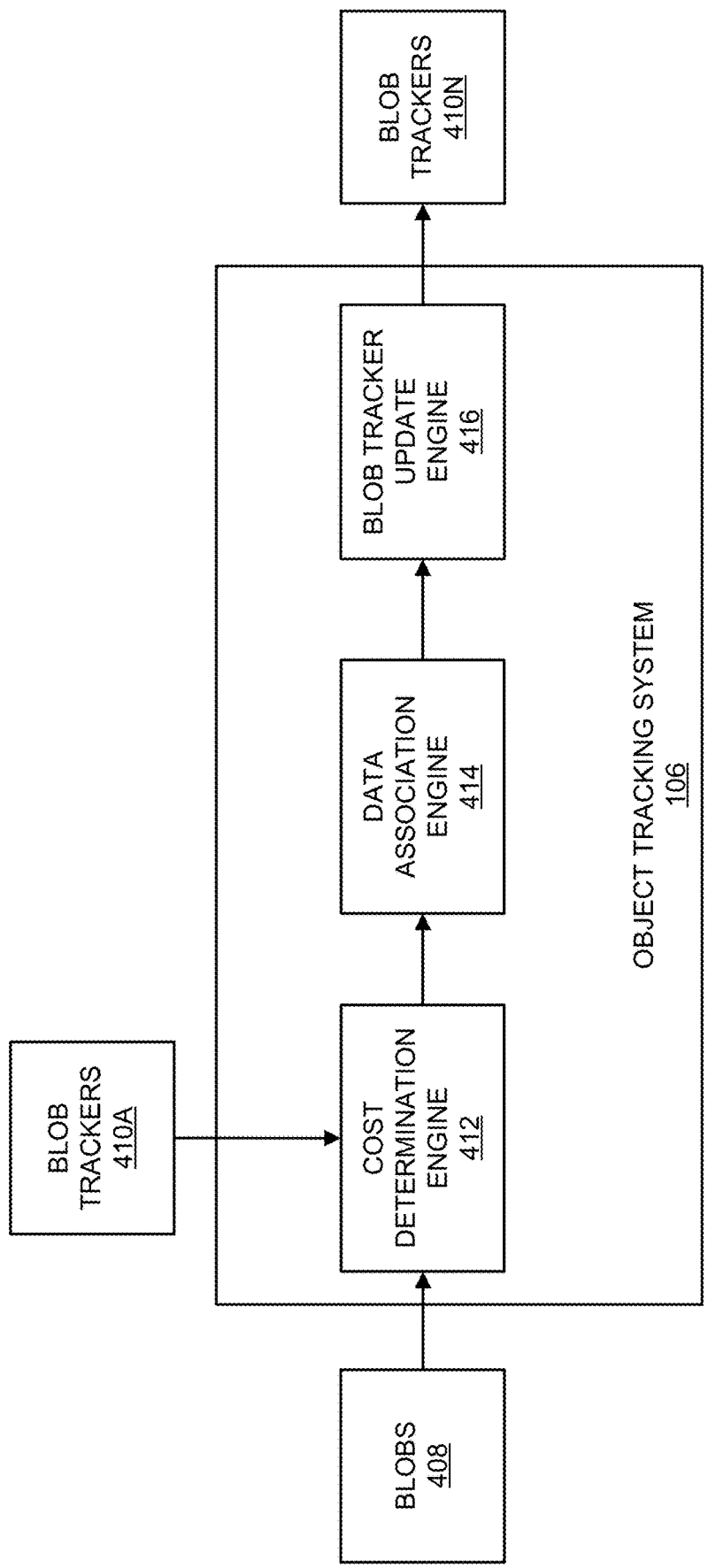
FIG. 4 is a block diagram illustrating an example of an object tracking system, in accordance with some examples.

Once the blobs are detected and processed, object tracking (also referred to as blob tracking) can be performed to track the detected blobs. FIG. 4 is a block diagram illustrating an example of an object tracking system 106. The input to the blob/object tracking is a list of the blobs 408 (e.g., the bounding boxes of the blobs) generated by the blob detection system 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking system 106 can obtain the blobs 408 of a current video frame from the blob detection system 104. The cost determination engine 412 can also obtain the blob trackers 410A updated from the previous video frame (e.g., video frame A 202A). A cost function can then be used to calculate costs between the blob trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection system 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) (e.g., the blob(s) bounding box(es)) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal state or status. The temporal state of a tracker can include a new state indicating the tracker is a new tracker that was not present before the current frame, a normal state for a tracker that has been alive for a certain duration and that is to be output as an identified tracker-blob pair to the video analytics system, a lost state for a tracker that is not associated or matched with any foreground blob in the current frame, a dead state for a tracker that fails to associate with any blobs for a certain number of consecutive frames (e.g., two or more frames, a threshold duration, or the like), and/or other suitable temporal status. Another temporal state that can be maintained for a blob tracker is a duration of the tracker. The duration of a blob tracker includes the number of frames (or other temporal measurement, such as time) the tracker has been associated with one or more blobs.

There may be other state or status information needed for updating the tracker, which may require a state machine for object tracking. Given the information of the associated blob(s) and the tracker's own status history table, the status also needs to be updated. The state machine collects all the necessary information and updates the status accordingly. Various states or statuses of trackers can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration (a threshold duration) has passed, the tracker may be promoted to be a normal tracker. A normal tracker is output as an identified tracker-blob pair. For example, a tracker-blob pair is output at the system level as an event (e.g., presented as a tracked object on a display, output as an alert, and/or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As noted above, blob trackers can have various temporal states, such as a new state for a tracker of a current frame that was not present before the current frame, a lost state for a tracker that is not associated or matched with any foreground blob in the current frame, a dead state for a tracker that fails to associate with any blobs for a certain number of consecutive frames (e.g., 2 or more frames, a threshold duration, or the like), a normal state for a tracker that is to be output as an identified tracker-blob pair to the video analytics system, or other suitable tracker states. Another temporal state that can be maintained for a blob tracker is a duration of the tracker. The duration of a blob tracker includes the number of frames (or other temporal measurement, such as time) the tracker has been associated with one or more blobs.

A blob tracker can be promoted or converted to be a normal tracker when certain conditions are met. A tracker is given a new state when the tracker is created and its duration of being associated with any blobs is 0. The duration of the blob tracker can be monitored, as well as its temporal state (new, lost, hidden, or the like). As long as the current state is not hidden or lost, and as long as the duration is less than a threshold duration T1, the state of the new tracker is kept as a new state. A hidden tracker may refer to a tracker that was previously normal (thus independent), but later merged into another tracker C. In order to enable this hidden tracker to be identified later due to the anticipation that the merged object may be split later, it is still kept as associated with the other tracker C which is containing it.

The threshold duration T1 is a duration that a new blob tracker must be continuously associated with one or more blobs before it is converted to a normal tracker (transitioned to a normal state). The threshold duration can be a number of frames (e.g., at least N frames) or an amount of time. In one illustrative example, a blob tracker can be in a new state for 30 frames (corresponding to one second in systems that operate using 30 frames per second), or any other suitable number of frames or amount of time, before being converted to a normal tracker. If the blob tracker has been continuously associated with blobs for the threshold duration (duration ≥T1), the blob tracker is converted to a normal tracker by being transitioned from a new status to a normal status.

If, during the threshold duration T1, the new tracker becomes hidden or lost (e.g., not associated or matched with any foreground blob), the state of the tracker can be transitioned from new to dead, and the blob tracker can be removed from blob trackers maintained for a video sequence (e.g., removed from a buffer that stores the trackers for the video sequence).

In some examples, objects may intersect or group together, in which case the blob detection system can detect one blob (a merged blob) that contains more than one object of interest (e.g., multiple objects that are being tracked). For example, as a person walks near another person in a scene, the bounding boxes for the two persons can become a merged bounding box (corresponding to a merged blob). The merged bounding box can be tracked with a single blob tracker (referred to as a container tracker), which can include one of the blob trackers that was associated with one of the blobs making up the merged blob, with the other blob(s)' trackers being referred to as merge-contained trackers. For example, a merge-contained tracker is a tracker (new or normal) that was merged with another tracker when two blobs for the respective trackers are merged, and thus became hidden and carried by the container tracker.

A tracker that is split from an existing tracker is referred to as a split-new tracker. The tracker from which the split-new tracker is split is referred to as a parent tracker or a split-from tracker. In some examples, a split-new tracker can result from the association (or matching or mapping) of multiple blobs to one active tracker. For instance, one active tracker can only be mapped to one blob. All the other blobs (the blobs remaining from the multiple blobs that are not mapped to the tracker) cannot be mapped to any existing trackers. In such examples, new trackers will be created for the other blobs, and these new trackers are assigned the state "split-new." Such a split-new tracker can be referred to as the child tracker of the original tracker its associated blob is mapped to. The corresponding original tracker can be referred to as the parent tracker (or the split-from tracker) of the child tracker. In some examples, a split-new tracker can also result from a merge-contained tracker. As noted above, a merge-contained tracker is a tracker that was merged with another tracker (when two blobs for the respective trackers are merged) and thus became hidden and carried by the container tracker. A merge-contained tracker can be split from the container tracker if the container tracker is active and the container tracker has a mapped blob in the current frame.

As previously described, the threshold duration T1 is a duration that a new blob tracker must be continuously associated with one or more blobs before it is converted to a normal tracker. A threshold duration T2 is a duration a split-new tracker must be continuously associated with one or more blobs before it is converted to a normal tracker. In some examples, the threshold duration T2 used for split-new trackers can be the same as the threshold duration T1 used for new trackers (e.g., 20 frames, 30 frames, 32 frames, 60 frames, 1 second, 2 seconds, or other suitable duration or number of frames). In other examples, the threshold duration T2 for split-new trackers can be a shorter duration than the threshold duration T1 used for new trackers. For example, T2 can be set to a smaller value than T1. In some implementations, the duration T2 can be proportional to T1. In one illustrative example, T1 may indicate one second of duration, and thus is equal to the (average) frame rate of the input video (e.g., 30 frames at 30 frames per second, 60 frames at 60 frames per second, or other suitable duration and frame rate). In such an example, the duration T2 can be set to half of T1.

Figure 5:
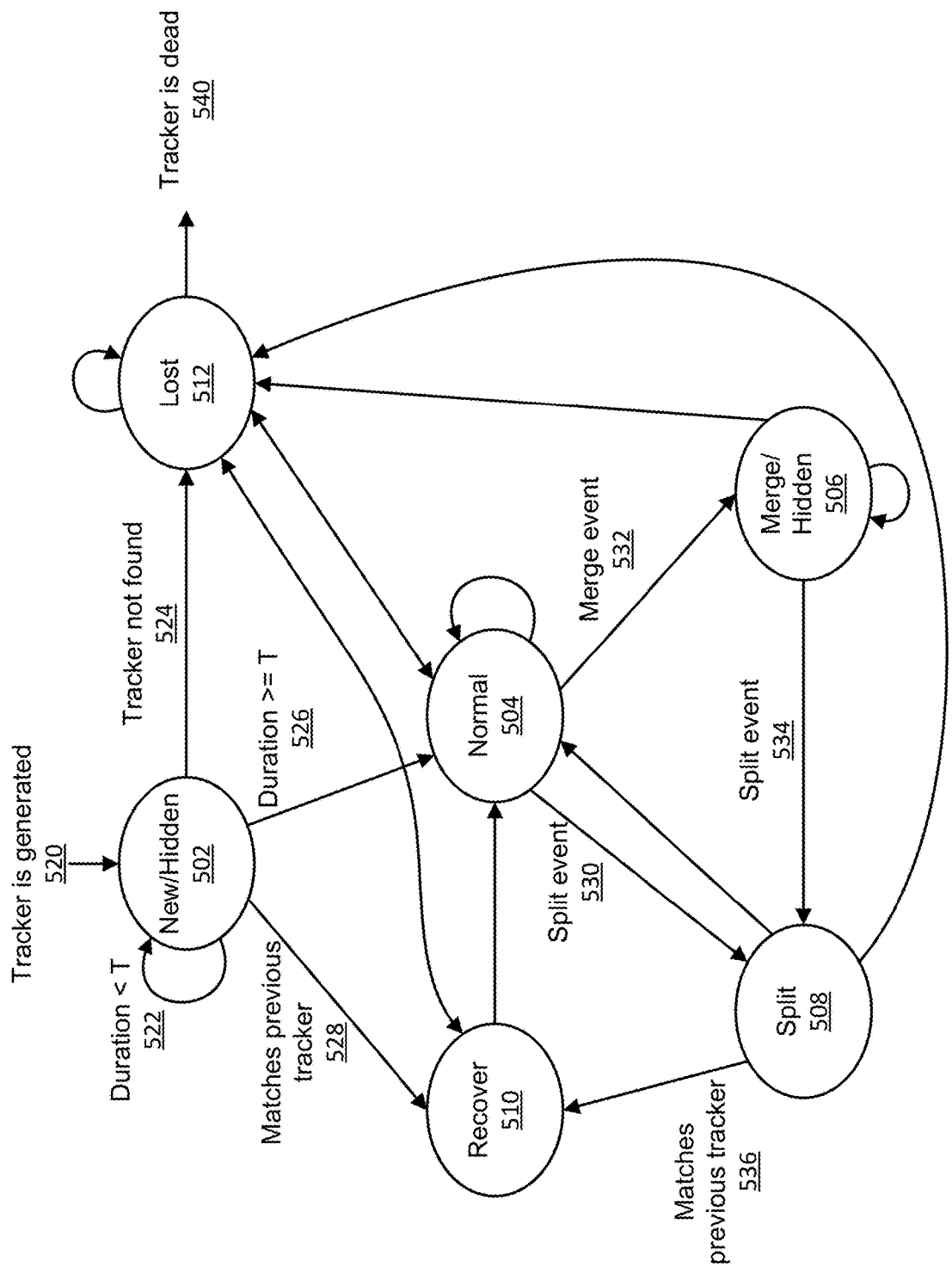
FIG. 5 is a diagram illustrating an example of states that a tracker can undergo through the course of a tracker's existence, in accordance with some examples.

FIG. 5 illustrates an example of states that a tracker can undergo through the course of a tracker's existence. In many cases, a tracker may experience fewer than all of the example states. In various implementations, a tracker may experience additional states that are not illustrated here. Each state transition, illustrated in this example with an arrow, can occur upon the receipt of data corresponding to a new input video frame.

At transition 520, a new tracker can be generated. The new tracker can have an initial state of New and/or Hidden 502. As discussed above, a new tracker can be generated when, for a given video frame, a blob is detected for which no tracker can be found. As also discussed above, new trackers may be "hidden," meaning that the blob that corresponds to the tracker may not yet be tracked. Hidden new trackers may not be output from the system.

As illustrated by transition 522, a New/Hidden 502 tracker may remain New/Hidden 502 while a duration is less than a threshold, T The duration may be counted as a number of frames, a number of milliseconds or seconds, or by some other measure of time. During the duration, the system may not yet have sufficient data to confirm that a blob that corresponds to the New/Hidden 502 tracker is an object moving within the scene. For example, the blob may be visual noise or tree leaves moving in the wind, or some other pixels that should be classified as background pixels. Alternatively or additionally, the blob may be within the scene for only fractions of a second, and thus not be present long enough to be tracked.

In this and other examples, while the duration is less than T, the tracker may undergo transition 524, in which, for a current video frame, the tracker can no longer be matched to a blob. The tracker may then be considered Lost 512. Lost trackers are discussed further below.

Alternatively, when the duration is greater than or equal to T, the tracker may undergo transition 526, and become a Normal 504 tracker. In subsequent frames, the tracker may remain Normal 504, unless an event, such as a split event 530 or a merge event 532 occurs, or the tracker becomes Lost 512. As noted above, a tracker can become Lost 512 when the blob that corresponds to the tracker cannot be found in the current video frame.

Alternatively, a New/Hidden 502 tracker can become a Recover 510 tracker through transition 528, when the system determines that the tracker matches a previous tracker. This can occur, for example, when an object is stationary within the scene for long enough to be classified as background pixels, and thus becomes Lost 512, and then the object starts moving again. As another example, an object may move out of view (possibly becoming Lost 512) and then come back into view. In some implementations, the Recover 510 tracker inherits the data of the tracker that matched the Recover 510 tracker. In some implementations, and not illustrated here, the Recover 510 tracker may be deleted, and a Lost 512 tracker that matched the Recover 510 track may be transitioned to the Recover 510 state. A Recover 510 tracker can transition to Normal 504 in a subsequent video frame, or can transition to Lost 512.

As noted above, a merge event 532 can occur when to blobs are within a certain distance of each other within the scene, and thus are recognized by the system as one object. For example, two people may enter the scene from opposite directions, and walk together for a while. When a merge event 532 occurs, a normal 504 tracker may become a Merge/Hidden 506 tracker. A merge tracker can inherit the data from the trackers that have been merged together. In some implementations, one of the trackers may be considered a "parent" or "root" tracker, and all other trackers in the merge group can be considered "children" or "leaves." In some implementations, the parent tracker continues to be tracked in subsequent frames, while the child trackers are hidden, meaning the child trackers may be updated along with the parent tracker, but the child trackers are not output by the system. In various implementations, a Merge/Hidden 506 tracker remains in this state unless a split event 534 occurs, or the Merge/Hidden 506 tracker becomes Lost 512.

When a split event 534 occurs, a blob that is associated with the tracker splits into two or more blobs, each of which can be assigned a different tracker by the system. A Normal 504 tracker can also undergo a split event 530, such as for example when two people walk together into the scene and are identified as one blob, and then later walk in two different directions and are identified as two different blobs. A Split 508 tracker can inherit the tracking data of the Normal 504 tracker, such that each tracker that is split from the Normal 504 tracker retains the tracking history of the Normal 504 tracker. In a subsequent frame, the Split 508 tracker may transition to Normal 504. This transition may occur, for example, after a duration has passed. A group of Split 508 trackers that resulted from one blob splitting into multiple blobs can be referred to as a split group.

When a Split 508 tracker splits from a Merge/Hidden 506 tracker, in some cases the Split 508 tracker may inherit the data from the Merge/Hidden 506 tracker, including the data from the parent tracker and any child trackers. Alternatively, in some implementations, the Split 508 tracker may be matched to the parent tracker or one of the child trackers, meaning that the system determines that the Split 508 tracker is for a blob that previously merged with another blob. When this occurs, the Split 508 tracker may undergo transition 536, and become a Recover 510 tracker.

As illustrated in the example of FIG. 5, a New/Hidden 502 tracker, a Recover 510 tracker, a Normal 504 tracker, a Merge/Hidden 506 tracker, or a Split 508 tracker can become Lost 512 before undergoing any other state transition. A tracker can become Lost 512 when, from a first video frame to a second video frame, a blob that was associated with the tracker in the first video frame cannot be found in the second video frame. The object represented by the blob may have moved out of view or may have become stationary, and have been included among background pixels. In some implementations, the system may maintain a tracker as Lost 512 for a period of time. During this period of time, the system may identify a blob that can be associated with the Lost 512 tracker, in which case the tracker may be transitioned to the Recover 510 state. In some implementations, a Lost 512 tracker, once associated with a blob, may transition directly to the Normal 504 state.

When a Lost 512 tracker remains lost for more than a pre-determined amount of time (e.g., ten frames, 5 or 10 milliseconds, or some other measure of time), the system may determine that the object that was being tracked is no longer in the scene. In such a case, at transition 540, the tracker may be considered dead. A dead tracker may be deleted from the tracking system.

As described above, blob detection can be performed for one or more video frames to generate or identify blobs representing one or more objects for the one or more video frames. Sometimes the scene captured in the video frames includes moving objects that are captured by the blob detection but should not be tracked. For example, the scene can include trees or bushes that move in the wind. In this example, the blob detection can detect and generate blobs for the trees or bushes, but the object tracking should not track these blobs. As another example, the scene can include a video screen displaying moving pictures. For example, a video screen on the side of a building may be displaying video advertising. In this example, the changing pixels in the area of the video screen may be captured by the blob detection, but the resulting blobs should not be tracked.

In these and other situations, an exclusion or exclusive zone can be defined manually (e.g., based on user input) and/or automatically based on object detection results. For example, a video analytics system can enable an operator or other user to manually delineate an exclusion zone. In some cases, the system can provide the operator with an input interface (e.g., on the device within which the video analytics system is installed or on a remote device) with which the operator can draw a box, a polygon, a circle, and/or other shape around or relative to one or more parts of the scene. For example, a box can be drawn around a video screen that is present in the scene, a polygonal shape can be drawn around a group of trees, among other examples. The box, circle, polygonal shape, or other shape can be designated by the operator as an exclusion zone. In these and other examples, the system can store the exclusion zone shape using coordinates of the vertices of the shape.

In some cases, object detection results can be used by the video analytics system to automatically define the exclusion zone. The object detection results can include an indication that at least one object in an area associated with the exclusion zone is a background object. In some cases, the object detection results can indicate that the object is a background object more than a threshold amount. For example, the threshold amount can include a certain percentage of background determinations for the object out of the entire object detection results for the object. In some examples, the threshold amount can include 50%, 60%, 70%, 80%, 90%, or any other user configurable percentage of the object detection results. The exclusion zone based on the object detection results. For example, if the object detection results indicate that the object is a background object more than the threshold amount of time, the video analytics system can define the area containing the object as the exclusion zone. Using 75% of the object detection results as an example of the threshold amount, if the object is detected as background for at least 75% of the frames contributing to the object detection results, the area containing the object can be defined as the exclusion zone. For example, a square, rectangle, or other suitable shape can automatically be defined around the area including the object. By automatically defining an exclusion zone based on object detection results, an exclusion zone can be generated for an area of a scene that include an object that occasionally moves, but is in fact a background object (e.g., a tree with moving branches and/or leaves, a computer monitor or television screen, or the like).

Figure 6:
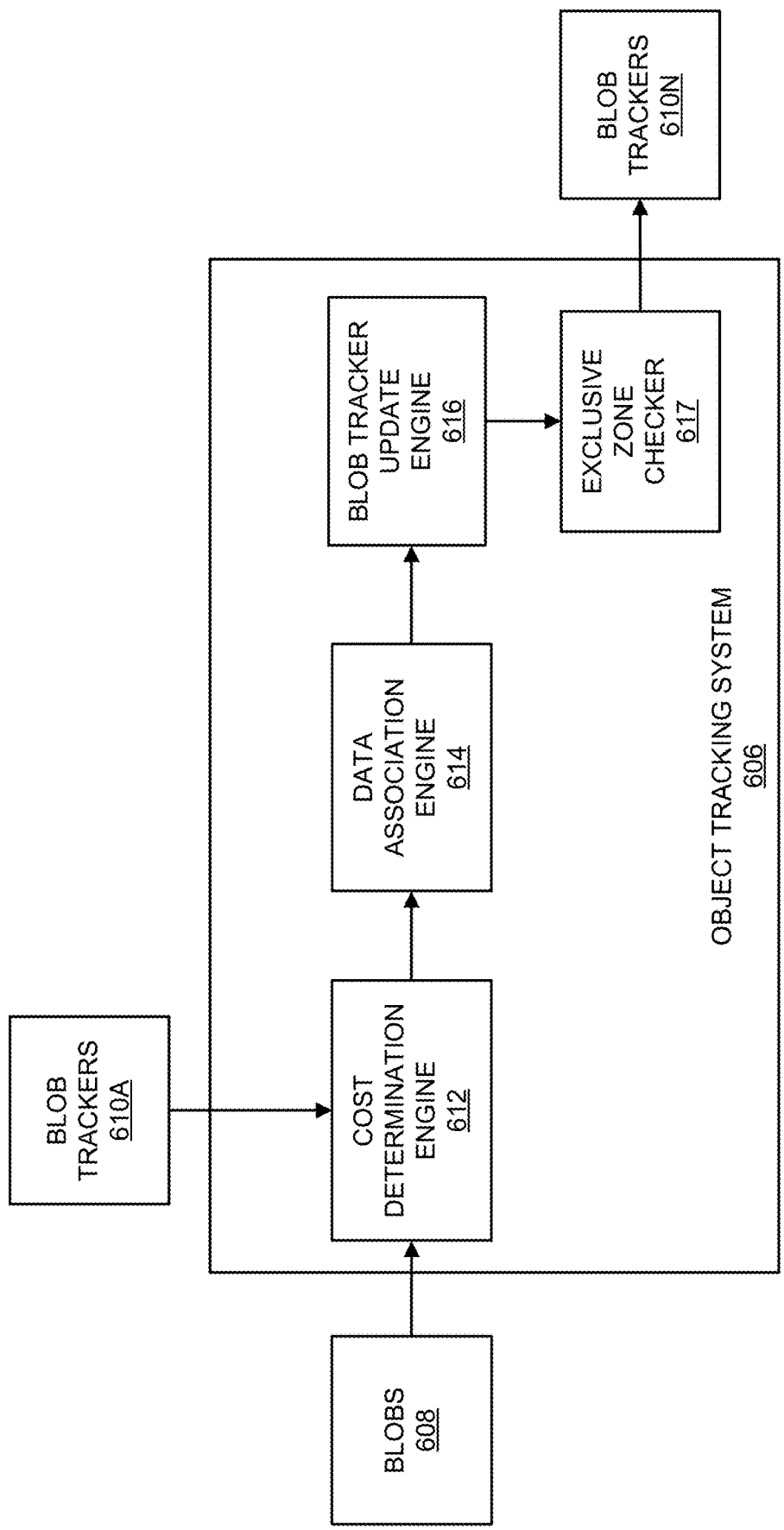
FIG. 6 is a block diagram illustrating an example of an object tracking system that includes an exclusive zone checker, in accordance with some examples.

The object tracking system can further use the exclusion zones to check whether a tracker should be output for a blob. FIG. 6 illustrates an example of an object tracking system 606 that includes an exclusive zone checker 617. In various implementations, the exclusive zone checker 617 is invoked after the blob tracker update engine 616, as an additional step before outputting blob trackers 610N. The blob tracker update engine 616 can operate similarly or the same as the blob tracker update engine 416 described above with respect to FIG. 4. The object tracking system 606 can further include a cost determination engine 612 and a data association engine 614, which can operate similarly or the same as the cost determination engine 412 and the data association engine 414, respectively, described above with respect to FIG. 4.

Blobs 608 and blob trackers 610A can be input into the object tracking system 606. In some cases, the blobs 608 can include a list of blobs. The blobs 608 can include blobs detected in a current video frame. In some cases, the blob trackers 610A can include a list of blob trackers. The blob trackers 610A can include trackers determined from previous video frames. The blob trackers 610A can include a history for blobs detected in the previous video frames, with each blob tracker providing a history for a particular object. For example, the history can include bounding boxes for the blob determined from previous video frames.

The cost determination engine 612 can apply a cost function to determine a cost between the blob trackers 610A and the blobs 608. For example, the cost determination engine 612 can measure a cost between a blob tracker and a blob by calculating the Euclidean distance between the object tracker and the bounding box for the blob. In some examples, the cost determination engine 612 determines a cost between each tracker and each blob in the list of blob trackers 610A and list of blobs 608. Further details of the cost determination engine 612 are described above with respect to the cost determination engine 412 of FIG. 4.

The data association engine 614 can match or assign a tracker to a blob based on the cost determined between the tracker and the blob. For example, a tracker-blob pair having a lowest cost, as determined by the cost determination engine 612, can be assigned to each other by the data association engine 614. In this and other examples, for some blobs, the data association engine 614 may find no tracker to assign to the blob, which may occur when the blob is newly detected in the current video frame. Further details of the data association engine 614 are described above with respect to the data association engine 414 of FIG. 4.

For tracker-blob pairs, the blob tracker update engine 616 can use information provided by the blob and a status of the tracker to update the tracker. Updating the tracker can include updating the current location of the tracker and/or a predicted location for the tracker. The predicted location can be based on a trajectory of the object, which can be determined from location history provided by the tracker and the location of the blob within the current video frame. The predicted location can predict the blob's location in the next video frame. Updating the tracker can also include updating a temporal status of the tracker, such as transitioning the tracker from a new tracker to a normal tracker. The blob tracker update engine 616 can output updated blob trackers 610N. Further details of the blob tracker update engine 616 are described above with respect to the blob tracker update engine 416 of FIG. 4.

In some implementations, the blob tracker update engine 616 can include the exclusive zone checker 617, which the blob tracker update engine 616 can apply when updating the blob trackers 610A. In some implementations, the exclusive zone checker 617 can be a separate component from the blob tracker update engine 616. As discussed further below, the exclusive zone checker 617 can determine whether a bounding box for a blob is interacting with an exclusive or exclusion zone in the current frame. In some cases, the exclusive zone checker 617 can result in the tracker for the blob being updated and output by the object tracking system 606. In some cases, the exclusive zone checker 617 can result in the tracker's status being updated to lost or dead, in which case the tracker is not output.

In various implementations, the blob tracker update engine 616 executes the exclusive zone checker 617 when updating the state of a tracker. For example, the exclusive zone checker 617 can be integrated into logic for determining the next state for a tracker. In some implementations, the exclusive zone checker 617 is a separate step executed before the blob trackers 610N are output. In these implementations, the exclusive zone checker 617 can look at the current and previous states of a tracker to determine whether the tracker should be output.

Figure 7:
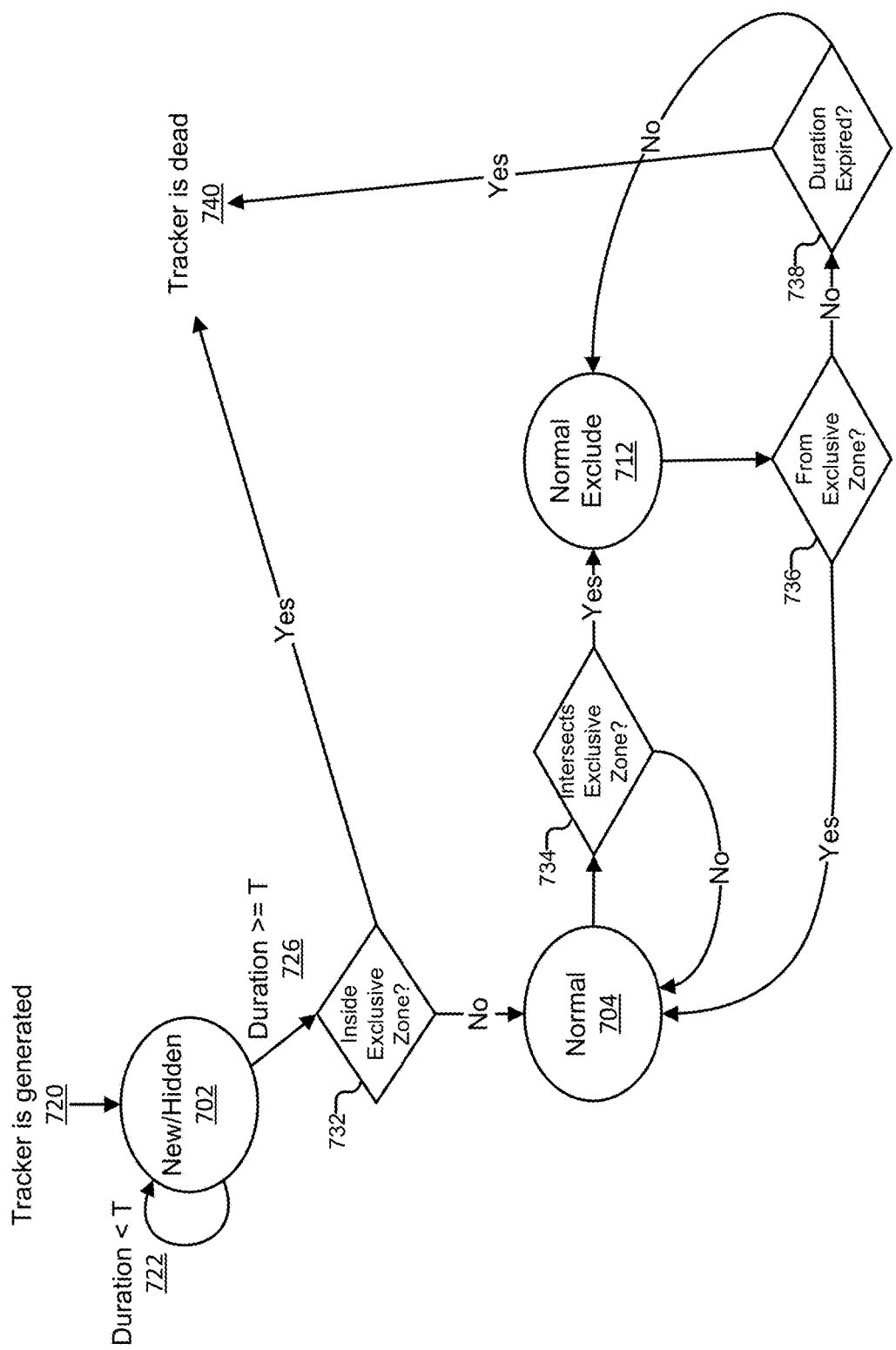
FIG. 7 is a diagram illustrating an example of tracker state transitions when a tracker is updated by the exclusive zone checker, in accordance with some examples.

FIG. 7 illustrates an example of tracker state transitions when a tracker is updated by the exclusive zone checker. The example states illustrated in FIG. 7 are similar to states illustrated in FIG. 5. In the example of FIG. 7, states that a tracker can have, but that might not be considered by the exclusive zone checker, have been omitted. Each state transition, illustrated in this example with an arrow, can occur when a new input video frame is received.

When a blob is detected in a current video frame and the object tracking system is unable to locate a tracker for the blob, a new tracker is generated for the blob, illustrated in FIG. 7 with transition 720. The state of the newly generated tracker is New and/or Hidden 702. As illustrated by transition 722, a New/Hidden 702 tracker may remain New/Hidden 702 while a duration is less than a threshold T The duration may be counted as a number of frames, a number of milliseconds or seconds, or by some other measure of time. During the duration, the system may not yet have sufficient data to confirm that a blob that corresponds to the New/Hidden 702 tracker is an object moving within the scene. While the tracker remains New/Hidden 702, the system might suppress the tracker, meaning that the tracker is not output as an identified tracker-blob pair (e.g., at the system level as an event, such as presented as a tracked object on a display, output as an alert, and/or other suitable event). When the tracker is not output, the blob associated with the tracker is indicated as not being tracked.

Once the duration is greater than or equal to T, the tracker can undergo transition 726 to step 732. At step 732, the object tracking system can check whether a bounding box for the blob is within the exclusion zone, where the bounding box can be a current or previous bounding box (e.g., where previous bounding boxes were determined in previous input frames). Here, the term "within" means that the bounding box for the bounding box overlaps with the area marked as the exclusion zone. In some implementations, the bounding box is considered within the exclusion zone only when the bounding box is entirely within the exclusion zone. In some implementations, the bounding box is considered within the exclusion zone when the bounding box overlaps with the exclusion zone by a threshold percentage (e.g., when 80%, 95%, or some other percentage of the bounding box overlaps with the exclusion zone). When the object tracking system determines that the bounding box for the blob is within the exclusion zone, the blob might be a false positive object within the exclusion zone (e.g., a moving tree or moving pictures on a video screen). The object tracker for the blob is thus transitioned to a dead state 740. A dead tracker is one that is not output by the system, and may be deleted by the system.

In some implementations, the test at step 732 can occur for every input frame received while the tracker is New/Hidden 702 (e.g., for every occurrence of the transition 722). In these implementations, the tracker can be transitioned to the dead state 740 in the first frame in which the blob associated with the tracker is within the exclusive zone. In some implementations, the test at step 732 occurs upon expiration of the duration. In these implementations, each frame received during the duration can be checked, and if the blob associated with the tracker was within the exclusive zone in any of these frames, the tracker is transitioned to the dead state 740. In some implementations, if the blob associated with the tracker starts in the exclusion zone and exits the exclusion zone before the end of the duration, it may be assumed that the blob is a legitimate object, and the tracker is transitioned to the Normal state 704.

When more than one exclusion zone is defined for the scene, each exclusion zone can be checked independently at step 732. In some implementations, when the tracker was in any of multiple exclusion zone during the duration, the tracker is transitioned from step 732 to the dead state 740. In some implementations, the tracker is only transitioned to the dead state 740 when the tracker's position the current input frame is in an exclusion zone.

When, at step 732, the object tracking system determines that the blob associated with the tracker has not been within the exclusion zone at any time while the tracker was New/Hidden 702, the tracker is transitioned to the Normal state 704.

Once the tracker is a normal tracker (in the Normal state 704), the tracker can be output by the video analytics system. As a normal tracker, the tracker is tested, at step 734, to see whether the blob associated with the tracker intersects with an exclusion zone. The exclusion zone tested at step 734 can be the same exclusion zone tested at step 732, or can be a different exclusion zone. The tracker can be tested for every input frame, for every other input frame, for every fifth input frame, or at some other interval.

To determine whether the blob is within the exclusion zone, at step 734, the object tracking system checks whether the bounding box for the blob intersects or overlaps with the area marked off as the exclusion zone. As noted above, the exclusion zone can be a rectangular shape, a polygonal shape, a partial shape (e.g., when an object or area that makes up the exclusion zone is partially in the scene), and/or other suitable shape. The object tracking system can determine the edges of the exclusion zone using the vertices of the shape (e.g., for a rectangular shape, an upper left corner, an upper right corner, a lower left corner, and a lower right corner), which can be specified, for example, using pixel coordinates. In some implementations, the bounding box for the blob tracker must be entirely within the exclusion zone for the associated blob to be considered within the exclusion zone. In some implementations, a certain threshold percentage, such as 85%, 90%, or some other suitable percentage, of the bounding box should be within the exclusion zone for the blob to be considered within the exclusion zone.

When, at step 734, the object tracking system determines that the blob is not within the exclusion zone, the tracker for the blob stays in the Normal state 704. When the blob is within the exclusion zone, the tracker for the blob can be transitioned to a Normal-Exclude state 712. The Normal-Exclude state 712 is the same as the Normal state 704, except that, while in the Normal-Exclude state 712, output of the tracker is prevented, meaning that the tracker is not output by the object tracking system. Though the tracker is not output, the object tracking system can continue tracking the blob while the tracker for the blob is in the Normal-Exclude state 712. Should the blob exit the exclusion zone, the tracking information for the blob can therefore be consistent (e.g., the blob can be identified by a same tracker identifier, the trajectory of the blob can be known from the tracker history, etc.).

In some implementations, when the tracker is in the Normal-Exclude state 712, instead of preventing or not outputting the tracker, the object tracking system can output a predicted bounding box. As discussed above, a predicted bounding box can predict the location of a blob in a next frame. For example, a location of a blob bounding box associated with a tracker in a current frame can be used as the predicted location of the tracker bounding box in the next frame. The predicted bounding box can be determined, for example, using a Kalman filter and/or a history of bounding boxes of the tracker. Because the blob may be overlapping with other moving objects within the exclusion zone, the width and height of the predicted bounding box may be explicitly fixed to the width and height of the tracker before the tracker transitioned to the Normal-Exclude state 712. In these implementations, the predicted bounding box can be used to determine whether, at step 736, the blob has exited the exclusion zone.

In some implementations, when, at step 734, the blob intersects with the exclusion zone, instead of transitioning to the Normal-Exclude state 712, the tracker may be transitioned to the dead state 740. In these implementations, the system determines to stop tracking the blob. Should the blob later exit the exclusion zone, the system will not attempt to recover the blob, and may instead generate a new tracker for the blob.

In some implementations, the object tracking system will attempt to track blobs that pass through an exclusion zone. In some cases, however, due to the movement of objects within the exclusion zone, the object tracking system may not be able to track a blob that is passing through the exclusion zone. For example, the object tracking system may identify multiple blobs within the exclusion zone, and the blob passing through the exclusion zone may appear to have merged with one of these multiple blobs. As another example, the object tracking system may identify most of the pixels within the exclusion zone as one blob, in which the blob that is passing through may not be individually identifiable.

In these and other examples, when a blob exits the exclusion zone, the object tracking system can attempt to find the tracker that was originally associated with the blob, before the blob entered the exclusion zone. At step 736, the system checks whether the tracker in the Normal-Exclude state 712 should be associated with a blob that has come from the exclusion zone. In this case, the exclusive zone is the same exclusion zone that is tested at step 734. When a blob starts in the exclusion zone and then exits the exclusion zone, there is a chance that the blob is the same object that was associated with the tracker when the tracker transitioned to the Normal-Exclude state 712.

In various implementations, to determine whether the tracker and the blob that came from the exclusion zone should be associated with one another, the object tracking system can use a trajectory of the tracker. The trajectory can be determined from the history of bounding boxes included in the tracker, where the history includes bounding boxes for a blob from previous input frames. For example, the system can determine a vector using the center point for each bounding box in the history. When, at step 736, a blob that has started in the exclusion zone is found outside the exclusion zone in the current frame, the object tracking system can check whether the blob falls within the trajectory of the tracker. When the blob does not fall along the trajectory, the blob and the tracker and not associated, and the tracker remains in the Normal-Exclude state 712.

When, at step 736, the blob that came from the exclusion zone does correspond to the trajectory of the tracker, then the blob is associated with the tracker and the tracker is transitioned to the Normal state 704.

Returning to step 736, when the tracker in the Normal-Exclude state 712 is not matched to any blob that came from the exclusion zone, the system next, at step 738, check whether a duration has expired. The duration can count the number of frames during which the tracker is in the Normal-Exclude state 712 due to the blob associated with the tracker being in the exclusion zone. The duration can be set to 5, 10, or 15 frames, or some other suitable number of frames. When, at step 738, the duration has not yet expired, the tracker remains in the Normal-Exclude state 712. From the Normal-Exclude state 712, the tracker can transition to the Normal state 704, as discussed above. Should the tracker transition to the Normal state 704, the tracker for the duration tested at step 738 is reset. When the scene includes more than one exclusion zone, a different duration limit can be specified for each exclusion zone.

When, at step 738, the duration has expired, the tracker is transitioned to the dead state 740. In this case, the system assumes that the blob associated with the tracker is no longer in the scene and ended its movement in the exclusion zone. The object tracking system will thus make no further attempt to track the blob.

In some implementations, not illustrated in FIG. 7, the object tracking system may be about to transition the tracker to a "vanishing" status. The vanishing status can occur when the object tracking system includes sleeping object detection. A sleeping object is one that has stopped moving in the scene for a sufficient amount of time to begin being absorbed into the background model. In some cases, the object should continue to be identified and tracked. For example, the object may be a parked car that is expected to start moving again, or a person who is sitting and may later get up and start walking. The sleeping object detection can transition a tracker to the "vanishing" state when a blob begins to be absorbed into the background (e.g., as the background subtraction process begins to detect the blob as background). When the object appears to still be present in the scene but is stationary, the tracker for the object can be transitioned to "sleeping."

In some implementations, when the sleeping object detection determines the blob associated with a tracker is beginning to vanish, before transitioning the tracker to the "vanishing" state, the object tracking system can test whether the blob associated with the tracker intersects with an exclusion zone. The blob may need to be fully within the exclusion zone or can be partially within the exclusion zone (e.g., overlapping by a threshold amount). When the blob associated with the tracker is within an exclusion zone, instead of transitioning the tracker to the "vanishing" state, the tracker is transitioned to the "none" state. In the "none" state, the blob may be allowed to vanish into the background, so that the tracker for the blob eventually becomes lost (e.g., once the blob is no longer detected as a foreground blob due to the pixels of the blob being determined as background pixels by background subtraction). Thus, when a blob is in an exclusion zone and begins to vanish, the system does not attempt to keep tracking the object.

Figure 8:
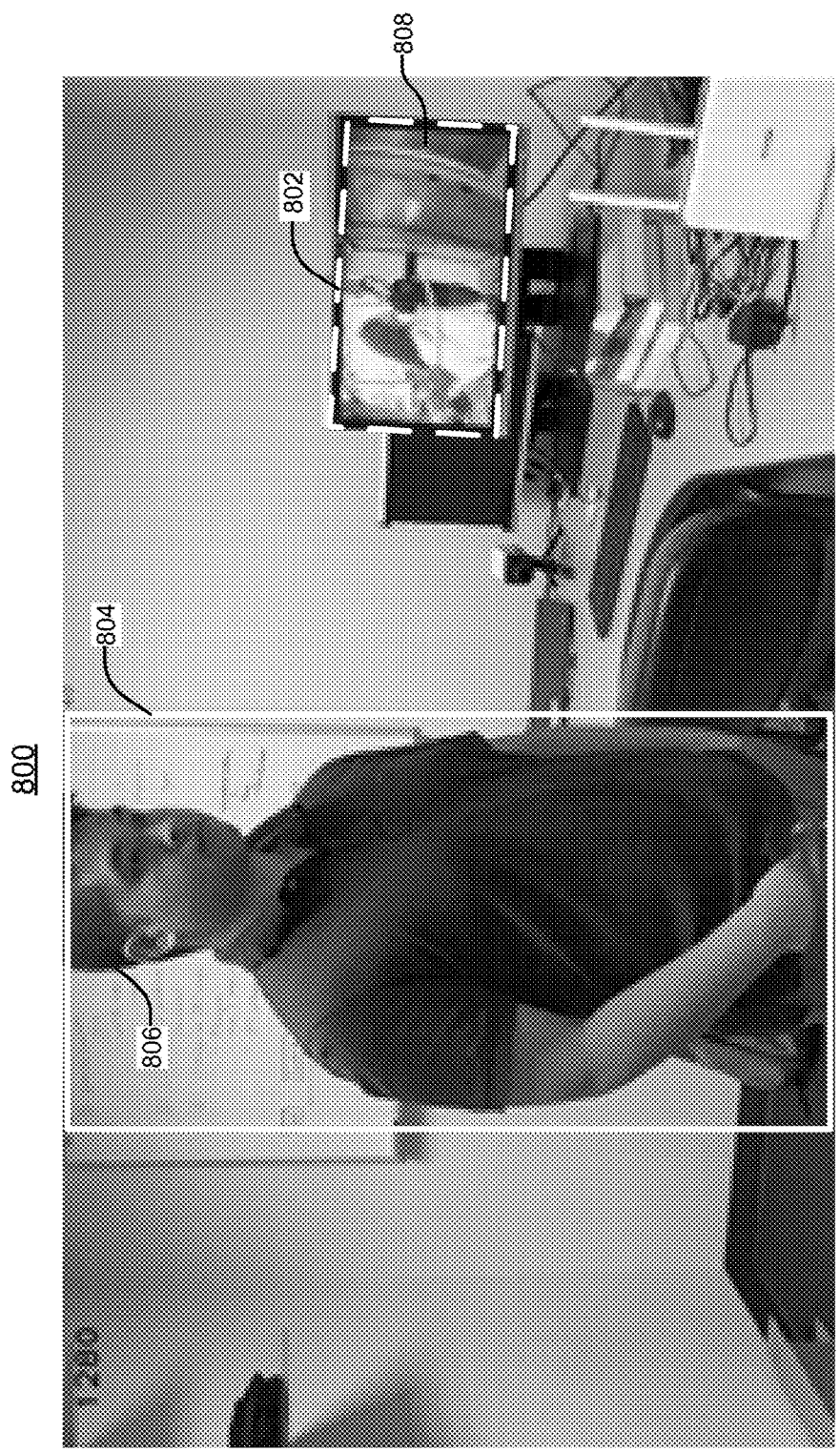
FIG. 8 is an example of a video frame that includes an exclusive or exclusion zone, in accordance with some examples.

FIG. 8 illustrates an example of a video frame 800 that includes an exclusion zone 802 (shown as a bounding box having a dotted outline). In this example, the scene includes video screen 808 displaying an active video. The objects moving on the video screen 808 can be identified by the object tracking system as blobs, but, in this example, should not be tracked. Thus, a box has been drawn around a video screen, such that the area encompassed by the box is treated as an exclusion zone 802. As noted above, the box can be input by an operator of the camera.

Objects outside the exclusion zone 802 can still be tracked. For example, a person 806 walking in the scene is identified in the example video frame 800 with a bounding box 804. So long as the person 806 moves in the area of the video frame that is outside the exclusion zone 802, the person 806 can be tracked.

Figure 9A:
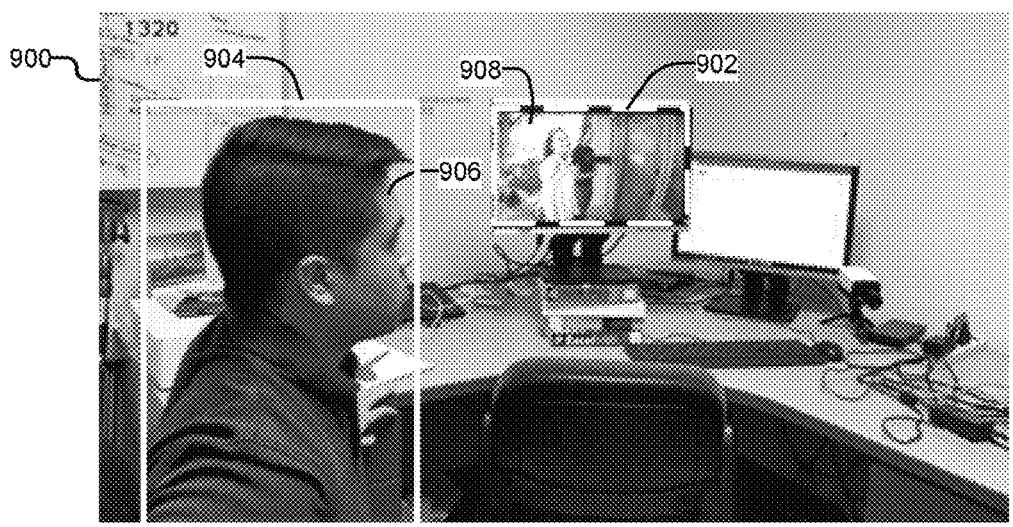
FIG. 9A, FIG. 9B, and FIG. 9C illustrate an example of a sequence of video frames in which an object moves through an exclusion zone, in accordance with some examples.
Figure 9B:
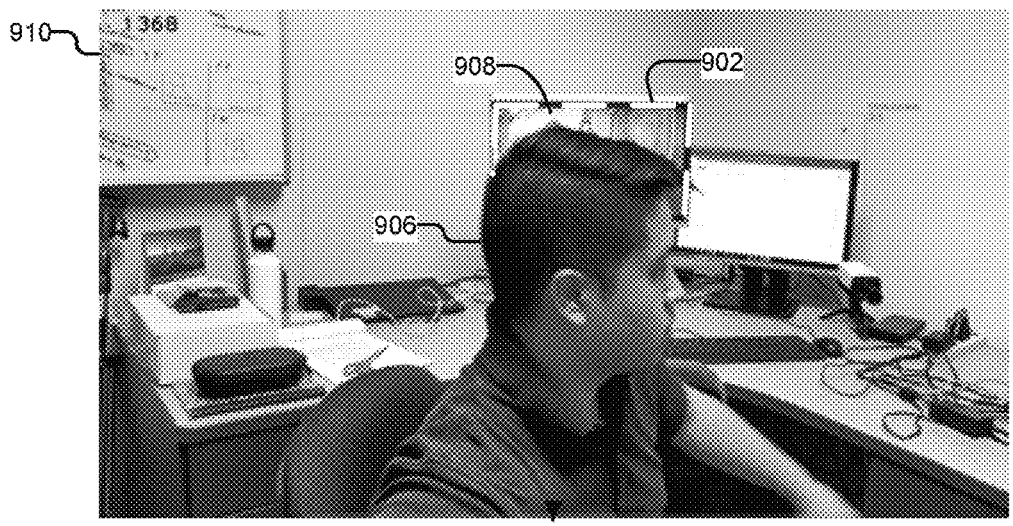
Figure 9C:

FIG. 9A, FIG. 9B, and FIG. 9C illustrate an example of a sequence of video frames in which an object (a person 906) moves through an exclusion zone 902 (shown as a bounding box having a dotted outline). In this example, while the person 906 is within the exclusion zone 902, a bounding box 904 is not output for the person 906. Once the person 906 has moved out of the exclusion zone 902, the person 906 (and the tracker associated with the person 906) can be recovered and a bounding box 904 can be output for the person 906.

For example, as illustrated by the first video frame 900 in FIG. 9A, the scene includes a video screen 908 displaying moving pictures. Objects moving on the video screen 908 can be detected by the object tracking system as blobs, but, in this example should not be tracked. Thus an exclusion zone 902 has been drawn around the video screen 908.

Also present in the first video frame 900 is a person 906 who is moving from left to right in the scene. The person 906 is identified as a blob, and a bounding box 904 is output to identify the person 906. In the first video frame 900, an object tracker for the person 906 would be a normal tracker, causing the bounding box 904 of the normal tracker to be output for display.

As discussed above, the object tracking system can test, for every input video frame (or every other input frame, or some other interval of input frames) whether the person 906 intersects with the exclusion zone 902. In the second video frame 910, illustrated in FIG. 9B, the person 906 has continued to move to the right in the scene, and now is in front of the video screen 908. Though the person is still visible in the video frame 910, in some implementations, any intersection of the person 906 with the exclusion zone 902 drawn around the video screen 908 can cause the tracker for the person 906 to be transitioned to the lost state. In these implementations, the object tracking system can be conservatively configured, so that any objects found within the exclusion zone 902 are not incorrectly tracked. In some implementations, the person 906 need only intersect with the exclusion zone 902 by a threshold amount before the tracker is transitioned to the lost state. In this example, because the person 906 overlaps with the exclusion zone 902, the tracker for the person 906 is transitioned to the lost state and the bounding box 904 for the person 906 is not output for display in the video frame 910.

In the third video frame 920, illustrated in FIG. 9C, the person 906 has continued to move across the scene to the far right of the frame 920, and is now located outside of the exclusion zone 902. As discussed above, in some implementations, the object tracking system can continue to track the person 906 as the person 906 moves within the exclusion zone 902 (e.g., as the person passes through the exclusion zone in video frame 910 and in any other video frame prior to video frame 920). Thus, when the person 906 exits the exclusion zone 902, the person 906 is still associated with the same tracker with which the person 906 was associated before the person 906 entered the exclusion zone 902.

Figure 10A:
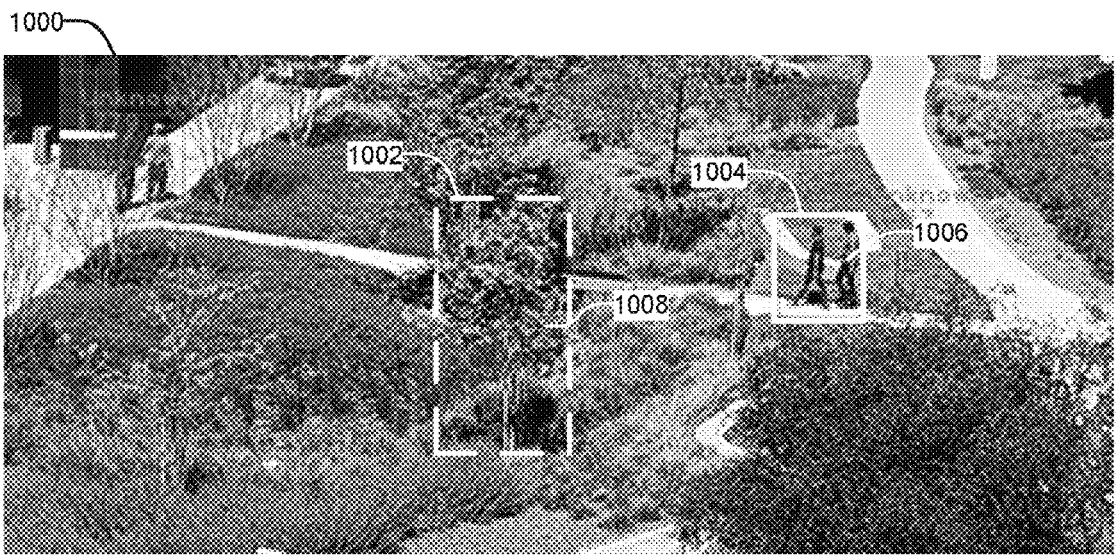
FIG. 10A, FIG. 10B, and FIG. 10C illustrate another example where an object moves through an exclusion zone, in accordance with some examples.
Figure 10B:
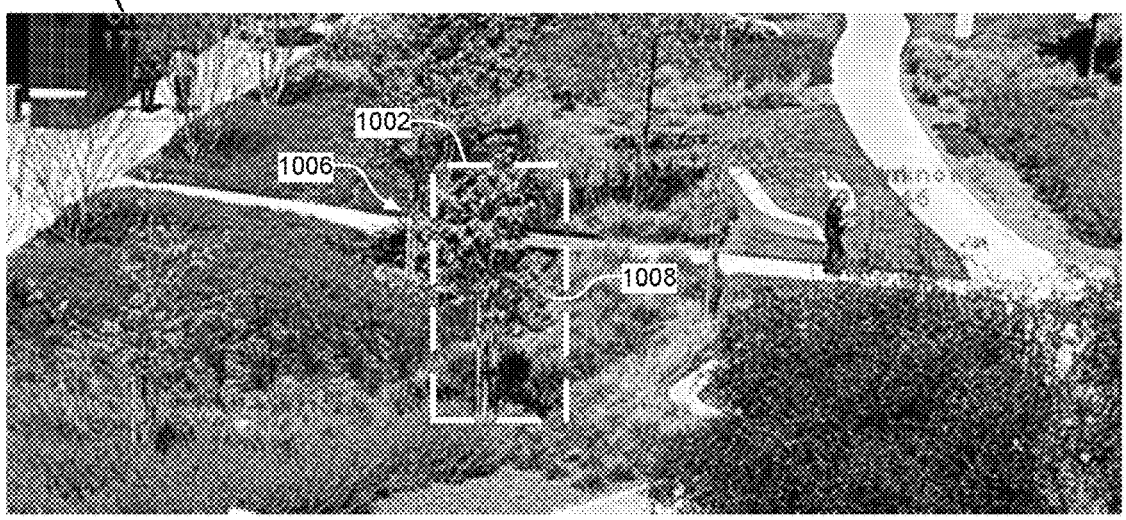
Figure 10C:
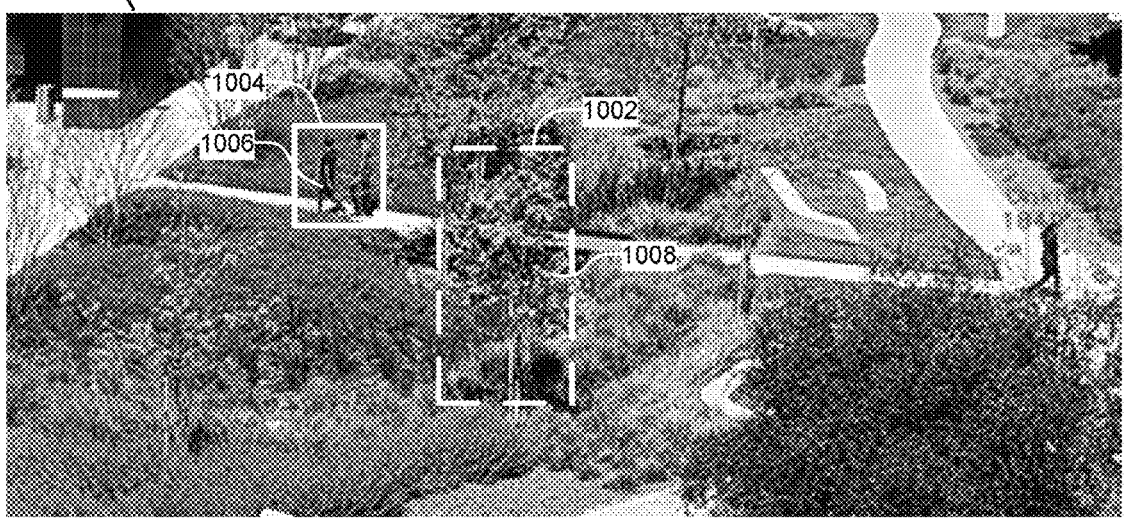

FIG. 10A, FIG. 10B, and FIG. 10C illustrate another example where an object (a group of people 1006) moves through an exclusion zone 1002 (shown as a bounding box having a dotted outline). As illustrated by a first video frame 1000, illustrated in FIG. 10A, the scene includes trees and bushes, including a tree 1008 that partially blocks a walking path in the scene. Because the tree 1008 may move when the wind blows, an exclusion zone 1002 has been drawn around the tree 1008 so that the tree is not tracked.

Also present in the first video frame 1000 is a group of people 1006, walking from right to left on the path that passes behind the tree 1008. In the first video frame 1000, the object tracking system correctly identifies the group of people 1006 as a moving object, and outputs a bounding box 1004 around the group of people 1006 for tracking the group of people 1006.

In the second video frame 1010, illustrated in FIG. 10B, the group of people 1006 has continued to move to the left along the path, and has walked behind the tree 1008 (as indicated by the arrow with numeral 1006). In the video frame 1010, the group of people 1006 is hidden by the tree 1008, and thus is legitimately lost in the scene. Because the object tracking system determines that the group of people 1006 overlaps with the exclusion zone 1002, the object tracking system does not output the corresponding bounding box 1004 for the group of people 1006. In some implementations, the object tracking system may transition the tracker for the group of people 1006 to the lost state or may transition the tracker to the dead state.

In the third video frame 1020, illustrated in FIG. 10C, the group of people 1006 has continued to move to the left along the path, and have emerged from behind the tree 1008. In some implementations, the object tracking system may attempt to find an object tracker for the group of people 1006. In these implementations, the object tracking system may identify the tracker that was formerly associated with the group of people 1006 (e.g., in the first video frame 900) as a lost tracker that should be associated with the group of people 1006 in the third video frame 1020. For example, the object tracking system can use a trajectory associated with the tracker, where the trajectory shows that the group of people 1006 was moving from right to left across a particular area of the frame, and where the location of the group of people 1006 in the third video frame 1020 corresponds to the trajectory. As another example, the object tracking system can use a predicted bounding box for the group of people 1006, determined, for example, for the first video frame 1000. In this example, the predicted bounding box can predict the location of the group of people 1006 to be about in the middle of the second video frame 1010 and to the left in the third video frame 1020.

In some implementations, the object tracking system does not attempt to recover at tracker for an object that has appeared to have originated in the exclusion zone 1002 and has moved out of the exclusion zone 1002. In these implementations, when the group of people 1006 appears in the third video frame 1020, the object tracking system can generate a new tracker to track the group of people 1006.

Figure 11A:
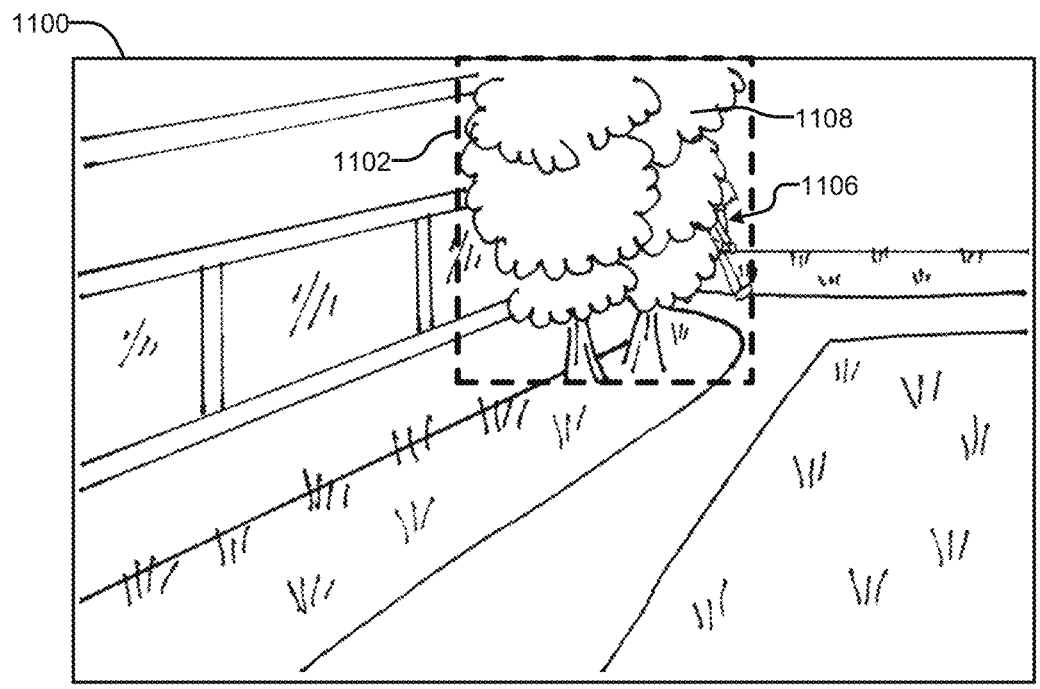
FIG. 11A and FIG. 11B illustrate an example of a sequence of video frames in which the status of an object as an object that should be tracked or is a false positive is determined by the ending position of the object, in accordance with some examples.
Figure 11B:
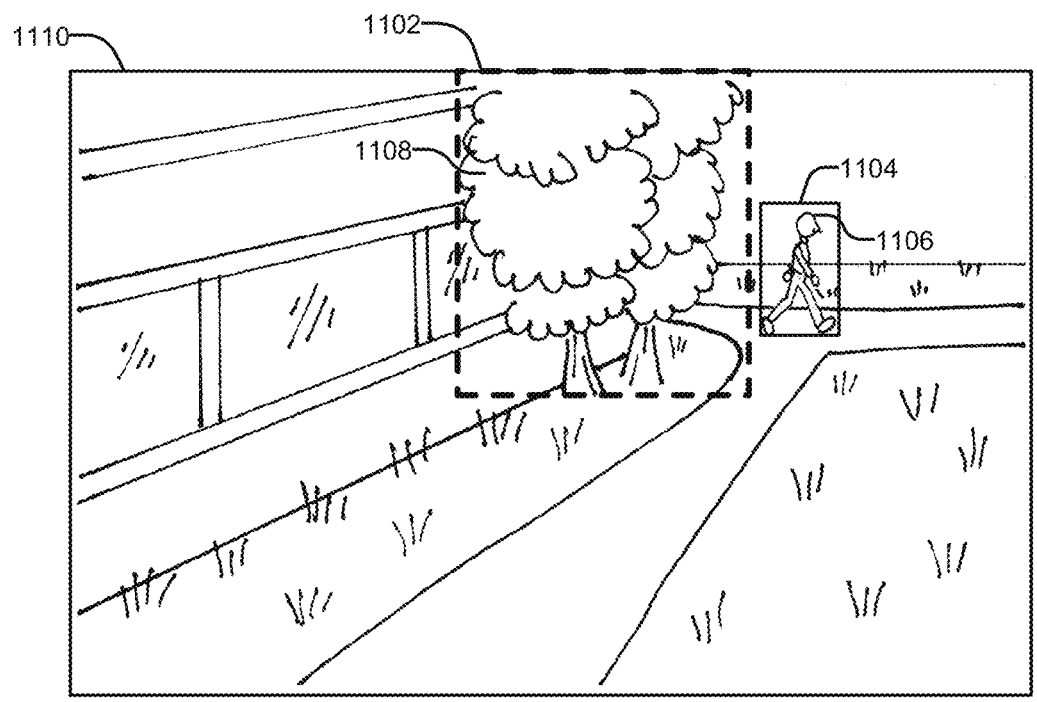

FIG. 11A and FIG. 11B illustrate an example of a sequence of video frames in which the status of an object as an object that should be tracked or as a false positive is determined by the ending position of the object. As illustrated in FIG. 11A by a first video frame 1100, an exclusion zone 1102 has been drawn around a group of trees 1108. The trees 1108 may move with the wind, and thus should not be tracked as moving objects. In this example, the trees 1108 sit at the corner of a building, and in front of a path. When a person 1106 walks along the path from behind the building and the tree 1108, the person 1106 is first detected (e.g., in the first video frame 1100) as a moving object within the exclusion zone 1102. Because the person 1106 is in the exclusion zone 1102, the object tracking system may generate a tracker for the person 1106, but the tracker is not output.

In the second video frame 1110, illustrated in FIG. 11B, the person 1106 has moved from behind the group of trees 1108. Since the person 1106 is now outside of the exclusion zone 1102 drawn around the group of trees 1108, the object tracking system should begin tracking the person 1106. In some implementations, the object tracking system can transition a tracker generated when the person 1106 was within the exclusion zone 1102 (e.g., in the first video frame 1100) from a lost or hidden state to a normal state. In some implementations, the object tracking system does not generate a tracker for the person 1106 while the person 1106 is within the exclusion zone 1102, due to uncertainty as to the pixels that should be associated with the person 1106. In these implementations, the object tracking system generates a tracker for the person 1106 once the person 1106 is outside of the exclusion zone 1102. In either case, a bounding box 1104 is output for the person in the second video frame 1110.

Figure 12A:
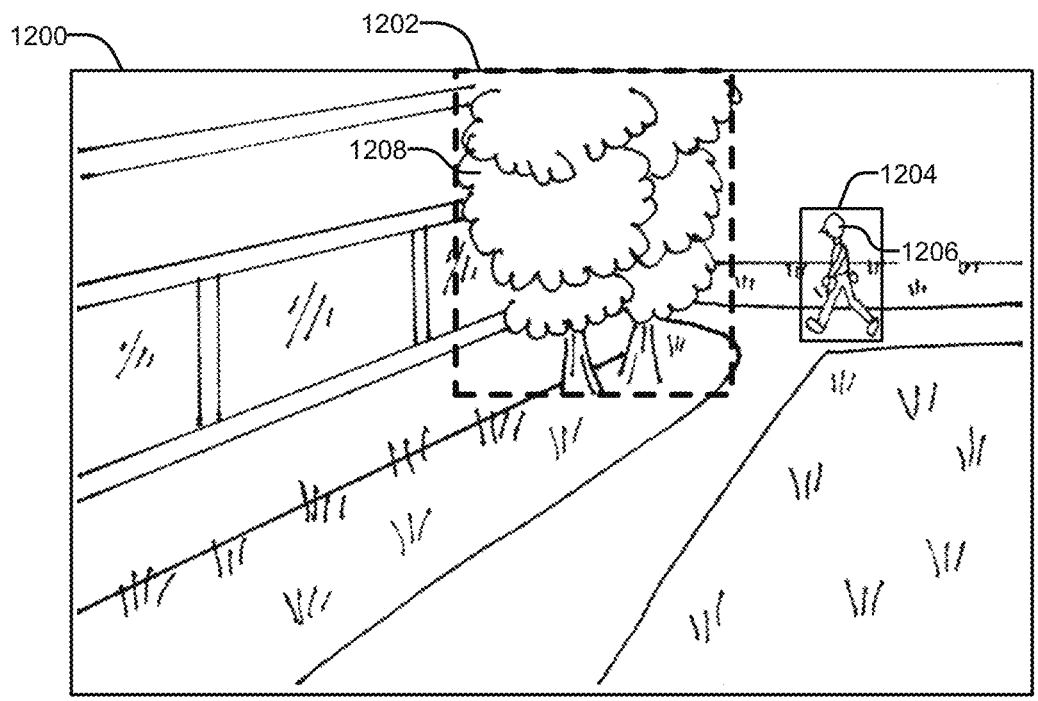
FIG. 12A and FIG. 12B illustrate an example of a sequence of video frames in which an object becomes permanently lost in an exclusion zone, in accordance with some examples.
Figure 12B:
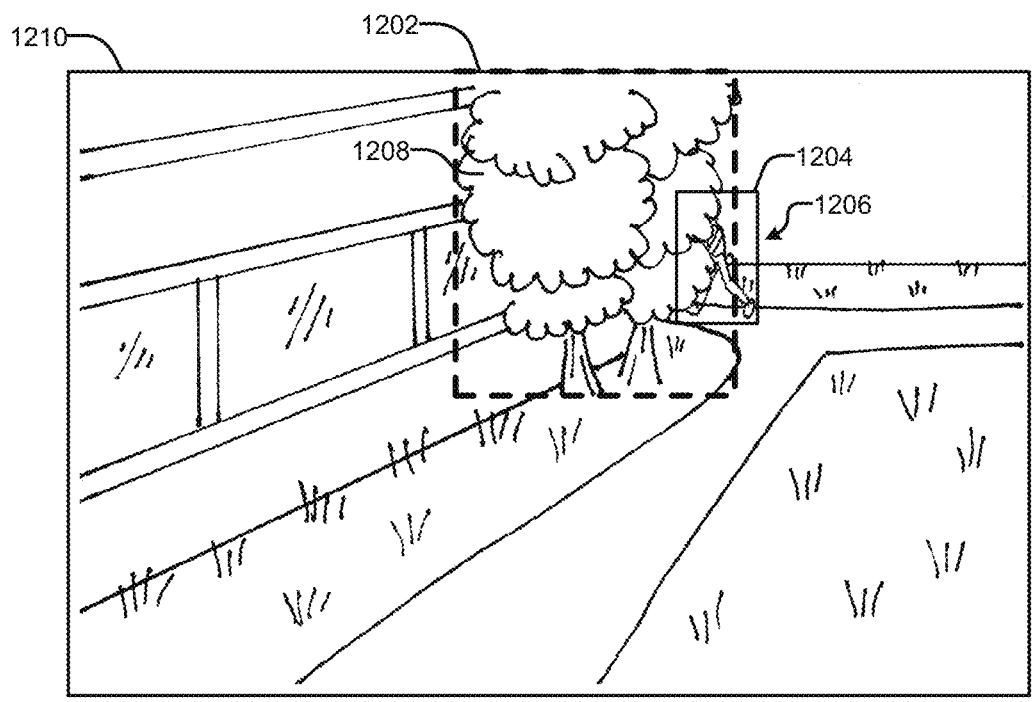

FIG. 12A and FIG. 12B illustrate an example of a sequence of video frames in which an object becomes permanently lost in an exclusion zone. As illustrated in FIG. 12A by a first video frame 1200, an exclusion zone 1202 has been drawn around a group of trees 1208 that block the corner of a building and a path that goes around the corner. A person 1206 is detected in the first video frame 1200, walking along the path and towards the group of trees 1208. In this first video frame 1200, the object tracking system is able to identify the person 1206 as a moving object, and outputs a bounding box 1204 for the person 1206.

In the second video frame 1210, illustrated in FIG. 12B, the person 1206 has moved behind the group of trees 1208 and into the exclusion zone 1202. As discussed above, the object tracking can determine that the bounding box 1204 for the person 1206 now interests with the exclusion zone 1202. In some implementations, the object tracking system will transition the tracker for the person 1206 to a lost or dead state. When the object tracking system transitions the tracker to the lost state, the object tracking system can continue to attempt to identify the person 1206 in subsequent frames, until a duration of frames have passed. Once the duration expires, the tracker is transitioned to the dead state.

Figure 13:
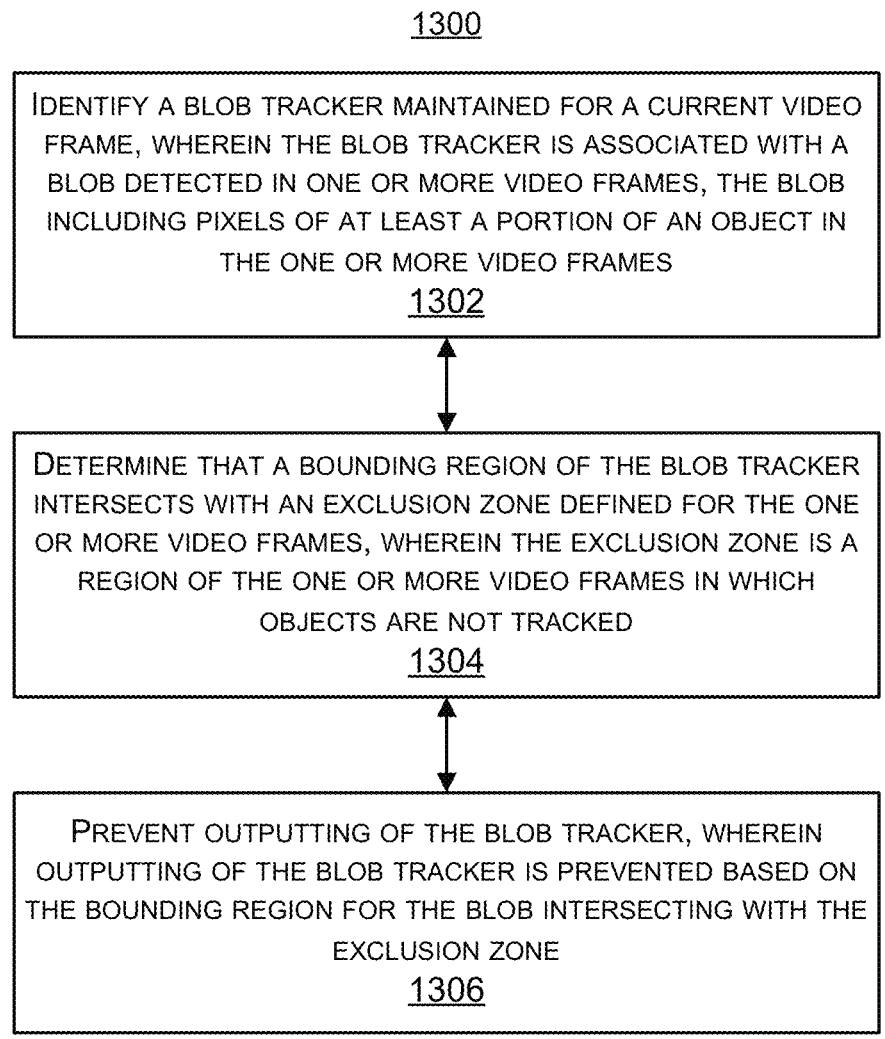
FIG. 13 illustrates an example of a process for identifying and preventing trackers for objects that are in an exclusive or exclusion zone, in accordance with some examples.

FIG. 13 illustrates an example of a process 1300 for identifying and preventing trackers for objects that are in an exclusive or exclusion zone, as described herein. At 1302, the process 1300 includes identifying a blob tracker maintained for a current video frame. The blob tracker is associated with a blob detected in one or more video frames, where the blob includes pixels of at least a portion of an object in the one or more video frames.

At 1304, the process 1300 includes determining that a bounding region of the blob tracker intersects with an exclusion zone defined for the one or more video frames. The exclusion zone is a region of the one or more video frames in which objects are not tracked. In some cases, a bounding region can include a bounding box, as described above. In some cases, a bounding region can include a non-rectangular shape, such as an ellipse, a circle, or other shape. In some implementations, the bounding region for the blob is determined to intersect with the exclusion zone when an area encompassed by the bounding region overlaps with the region of the exclusion zone by a threshold amount. The region of the exclusion zone is defined by two or more pixel locations in the one or more video frames.

The exclusion zone can be defined based on user input and/or based on a history of blob detection. For example, in some cases, the process 1300 can include receiving user input, and defining the exclusion zone based on the received user input. In some examples, the user input can be received using an input interface of the apparatus or computing device performing the process 1300. For instance, the input interface can include a touchscreen interface, a touchpad, a gesture input interface, a keyboard, and/or any other input interface that can receive user input. In some examples, the user input is received from a remote device. The remote device can include a device that is remote from the apparatus or computing device performing the process 1300. For example, a device in communication with the apparatus or computing device can receive user input, and can send the user input for receipt by the apparatus or computing device.

In some cases, the process 1300 can include obtaining object detection results for at least one video frame of the video frames. The object detection results can include a background indication for at least one object in an area associated with the exclusion zone. For example, object detection results, which can include results of background subtraction, can indicate that an object within the area is a background object. In some cases, the object detection results can indicate that the object is a background object more than a threshold amount. For example, the threshold amount can include a certain percentage of the entire object detection results. In one illustrative example, the threshold amount can include 90% of the object detection results. The process 1300 can define the exclusion zone based on the object detection results. For example, if the object detection results indicate that the object is a background object more than the threshold amount of time, the process 1300 can define the area containing the object as the exclusion zone. Continuing with the example above using 90% of the object detection results as the threshold amount, if the object is detected as background for at least 90% of the frames contributing to the object detection results, the area containing the object can be defined as the exclusion zone. By automatically defining an exclusion zone based on object detection results, an exclusion zone can be generated for an area of a scene that include an object that occasionally moves, but is in fact a background object (e.g., a tree with moving branches and/or leaves, a computer monitor or television screen, or the like).

In some cases, a state for the blob tracker is a new state. In these cases the process 1300 further includes determining whether to change the state from the new state to a normal state. Upon determining that the bounding region for the blob intersects with the exclusion zone, the state is changed to a dead state.

In some cases, the process 1300 can include continuing to track the blob while the bounding region for the blob intersects with the exclusion zone in one or more subsequent video frames.

In some cases, the state for the blob tracker is a vanishing state. As described above, the vanishing state or status can occur when the object tracking system includes sleeping object detection. A sleeping object is an object that has stopped moving in a scene for a sufficient amount of time to begin being absorbed into the background model (e.g., the object begins being detected as background). A blob tracker tracking such an object can be transitioned to the "vanishing" state when a blob representing with the object begins to be absorbed into the background (e.g., as the background subtraction process begins to detect the blob as background). When the object appears to still be present in the scene but is stationary, the tracker for the object can be transitioned to "sleeping." In these cases, the process 1300 further includes changing the state to a none state based on the bounding region for the blob intersecting with the exclusion zone.

At 1306, the process 1300 includes preventing outputting of the blob tracker to indicate that the blob is not being tracked, wherein outputting of the blob tracker is prevented based on the bounding region for the blob intersecting with the exclusion zone. In some implementations, preventing outputting of the blob tracker includes deleting the blob tracker. For example, the blob tracker can be removed (or deleted) from a list of trackers maintained for the sequence of video frames being analyzed. In some implementations, the process 1300 includes outputting a predicted bounding region in place of the blob tracker. In these implementations, the predicted bounding region can be determined using the blob tracker. Additionally, a dimension, such as the height and/or width, of the bounding region can be constrained to the corresponding dimension of the blob tracker. In these implementations, the height and/or width of the predicted bounding region remains unchanged as the blob moves within the exclusion zone.

In some cases the blob tracker can include a history of bounding regions including the bounding region. In these cases, the blob tracker is prevented from being output when any bounding region from the history of bounding regions is within the exclusion zone.

In some implementations, the process 1300 further includes determining, for a next video frame, that a next bounding region for the blob is outside the exclusion zone, the next bounding region being determined using the next video frame. In these implementations, the process 1300 can include outputting the blob tracker for the next video frame. The blob tracker is output based on the next bounding region for the blob being outside the exclusion zone. In some cases, the process 1300 can associate or re-associate (when the blob tracker was previously associated with the blob) the blob tracker with the blob based on the next bounding region for the blob being outside the exclusion zone. Associating or re-associating the blob tracker with the blob can cause the blob tracker to be output for the next video frame. In some cases, the blob tracker is output for the next video frame (and/or re-associated with the blob) based on a predicted bounding region associated with the blob tracker. In such cases, the next bounding region is in a location predicted by the predicted bounding region.

In some implementations, the process 1300 further includes determining, for a next video frame, that a count of video frames is greater than or equal to a threshold number of video frames. In these implementations, the process 1300 further includes deleting the blob tracker. For example, the blob tracker can be removed (or deleted) from a list of trackers maintained for the sequence of video frames being analyzed.

In some examples, the process 1300 may be performed by a computing device or an apparatus, such as the video analytics system 100. For example, the process 1300 can be performed by the video analytics system 100 and/or the object tracking system 606 shown in FIG. 6. In some cases, the computing device or apparatus may include a processor, microprocessor, microcomputer, or other component of a device that is configured to carry out the steps of process 1300. In some examples, the computing device or apparatus may include a camera configured to capture video data (e.g., a video sequence) including video frames. For example, the computing device may include a camera device (e.g., an IP camera or other type of camera device) that may include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some cases, the computing device may include a display for displaying images. For example, the computing device may include a mobile device with a display (and in some cases a camera, among other components). In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1300 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The video analytics operations discussed herein may be implemented using compressed video or using uncompressed video frames (before or after compression). An example video encoding and decoding system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for maintaining blob trackers for video frames, comprising:
   a memory configured to store video data associated with the video frames; and
   a processor coupled to the memory and configured to:
   identify a blob tracker maintained for a current video frame, wherein the blob tracker is associated with a blob detected in one or more video frames, the blob including pixels of at least a portion of an object in the one or more video frames;
   determine that a bounding region of the blob tracker intersects with an exclusion zone defined for the one or more video frames, the exclusion zone defining a pre-determined region of the one or more video frames in which one or more objects are not tracked when the one or more objects cover at least a part of the pre-determined region defined by the exclusion zone; and
   prevent outputting of the blob tracker, wherein outputting of the blob tracker is prevented based on the bounding region of the blob tracker intersecting with the exclusion zone.

2. The apparatus of claim 1, wherein the processor is further configured to:
   determine, for a next video frame, that a next bounding region of the blob tracker is outside the exclusion zone, the next bounding region being determined using the next video frame; and
   output the blob tracker for the next video frame.

3. The apparatus of claim 2, wherein the blob tracker is output for the next video frame based on a predicted bounding region associated with the blob tracker, and wherein the next bounding region is in a location predicted by the predicted bounding region.

4. The apparatus of claim 1, wherein the bounding region of the blob tracker is determined to intersect with the exclusion zone when an area encompassed by the bounding region overlaps with the pre-determined region of the exclusion zone by a threshold amount.

5. The apparatus of claim 1, wherein the processor is further configured to:
   receive user input; and
   define the exclusion zone based on the received user input.

6. The apparatus of claim 5, wherein the user input is received using an input interface of the apparatus.

7. The apparatus of claim 5, wherein the user input is received from a remote device.

8. The apparatus of claim 1, wherein the processor is further configured to:
   obtain object detection results for at least one video frame of the video frames, the object detection results including a background indication for at least one object in the pre-determined region associated with the exclusion zone; and
   define the exclusion zone based on the object detection results.

9. The apparatus of claim 1, wherein a state for the blob tracker is a new state, and wherein the processor is further configured to change the state to a dead state based on determining that the bounding region of the blob tracker intersects with the exclusion zone.

10. The apparatus of claim 1, wherein the blob tracker includes a history of bounding regions including the bounding region, and wherein the blob tracker is prevented from being output when any bounding region from the history of bounding regions is within the exclusion zone.

11. The apparatus of claim 1, wherein the processor is further configured to continue tracking the blob while the bounding region of the blob tracker intersects with the exclusion zone in one or more subsequent video frames.

12. The apparatus of claim 1, wherein a state for the blob tracker is a vanishing state, and wherein the processor is further configured to change the state to a none state based on the bounding region of the blob tracker intersecting with the exclusion zone.

13. The apparatus of claim 1, wherein the processor is further configured to:
   determine, for a next video frame, that a count of video frames is greater than or equal to a threshold number of video frames; and
   delete the blob tracker based on the count of video frames being greater than or equal to the threshold number of video frames.

14. The apparatus of claim 1, wherein the processor is further configured to:
   determine a predicted bounding region using the blob tracker, wherein a dimension of the predicted bounding region is constrained to a corresponding dimension of the blob tracker; and output the predicted bounding region in place of the blob tracker.

15. The apparatus of claim 1, wherein preventing outputting of the blob tracker includes deleting the blob tracker.

16. The apparatus of claim 1, further comprising at least one of a camera configured to capture the one or more video frames and a display configured to display the one or more video frames.

17. A method of maintaining blob trackers for video frames, the method comprising:
   identifying a blob tracker maintained for a current video frame, wherein the blob tracker is associated with a blob detected in one or more video frames, the blob including pixels of at least a portion of an object in the one or more video frames;
   determining that a bounding region of the blob tracker intersects with an exclusion zone defined for the one or more video frames, the exclusion zone defining a pre-determined region of the one or more video frames in which one or more objects are not tracked when the one or more objects cover at least a part of the pre-determined region defined by the exclusion zone; and
   preventing outputting of the blob tracker to indicate that the blob is not being tracked, wherein outputting of the blob tracker is prevented based on the bounding region of the blob tracker intersecting with the exclusion zone.

18. The method of claim 17, further comprising:
   determining, for a next video frame, that a next bounding region of the blob tracker is outside the exclusion zone, the next bounding region being determined using the next video frame; and
   outputting the blob tracker for the next video frame.

19. The method of claim 18, wherein the blob tracker is output for the next video frame based on a predicted bounding region associated with the blob tracker, wherein the next bounding region is in a location predicted by the predicted bounding region.

20. The method of claim 17, wherein the bounding region of the blob tracker is determined to intersect with the exclusion zone when an area encompassed by the bounding region overlaps with the pre-determined region of the exclusion zone by a threshold amount.

21. The method of claim 17, further comprising:
   receiving user input; and
   defining the exclusion zone based on the received user input.

22. The method of claim 21, wherein the user input is received from a remote device.

23. The method of claim 17, further comprising:
   obtaining object detection results for at least one video frame of the video frames, the object detection results including a background indication for at least one object in the pre-determined region associated with the exclusion zone; and
   defining the exclusion zone based on the object detection results.

24. The method of claim 17, wherein a state for the blob tracker is a new state, and further comprising changing the state to a dead state based on determining that the bounding region for the blob intersects with the exclusion zone.

25. The method of claim 17, wherein the blob tracker includes a history of bounding regions including the bounding region, and wherein the blob tracker is prevented from being output when any bounding region from the history of bounding regions is within the exclusion zone.

26. The method of claim 17, further comprising continuing to track the blob while the bounding region of the blob tracker intersects with the exclusion zone in one or more subsequent video frames.

27. The method of claim 17, wherein a state for the blob tracker is a vanishing state, and further comprising changing the state to a none state based on the bounding region of the blob tracker intersecting with the exclusion zone.

28. The method of claim 17, further comprising:
   determining, for a next video frame, that a count of video frames is greater than or equal to a threshold number of video frames; and
   deleting the blob tracker based on the count of video frames being greater than or equal to the threshold number of video frames.

29. The method of claim 17, further comprising:
   determining a predicted bounding region using the blob tracker, wherein a dimension of the predicted bounding region is constrained to a corresponding dimension of the blob tracker; and
   outputting the predicted bounding region in place of the blob tracker.

30. The method of claim 17, wherein preventing outputting of the blob tracker includes deleting the blob tracker.

* * * * *